Figure 1A:
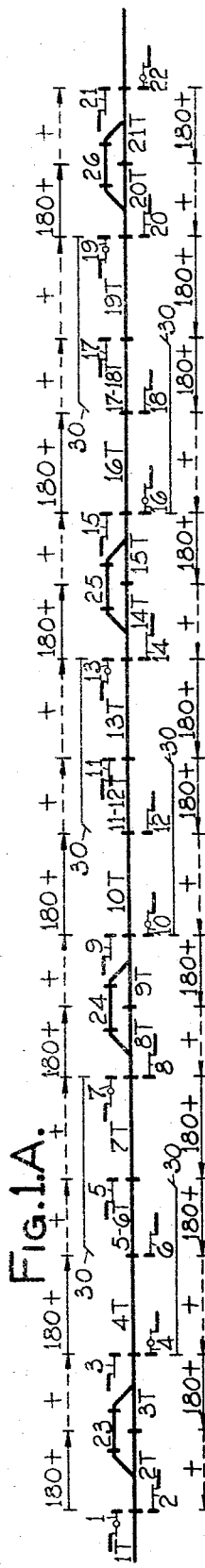

July 28, 1942.  T. J. JUDGE  2,291,579

CODED TRACK CIRCUIT SIGNALING SYSTEM

Filed May 2, 1941  9 Sheets-Sheet 1

INVENTOR
T. J. Judge,
BY Neil W. Preston,
his ATTORNEY

July 28, 1942.  T. J. JUDGE  2,291,579
CODED TRACK CIRCUIT SIGNALING SYSTEM
Filed May 2, 1941  9 Sheets-Sheet 2

INVENTOR
T. J. Judge,
BY Neil W. Preston,
his ATTORNEY

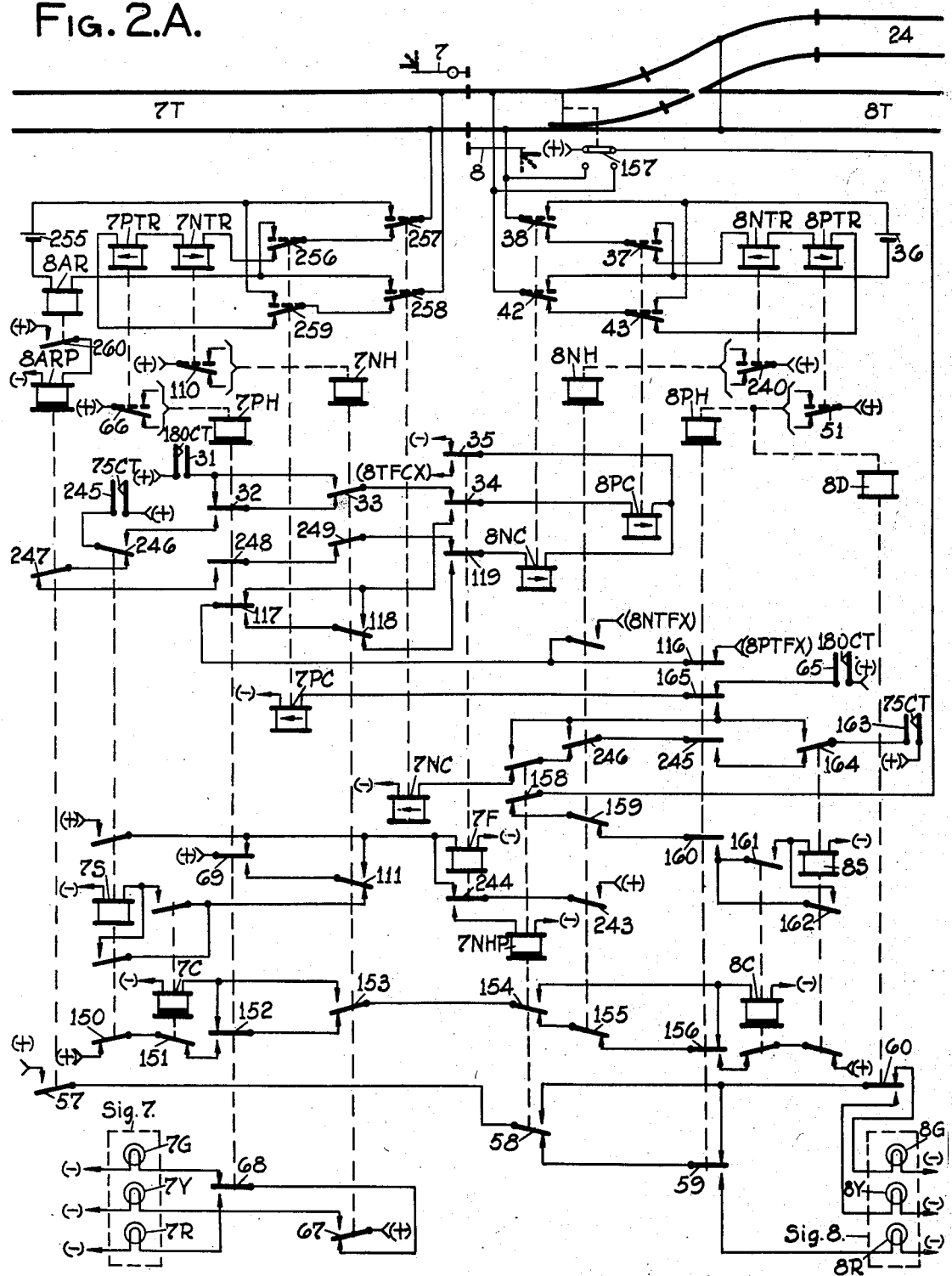

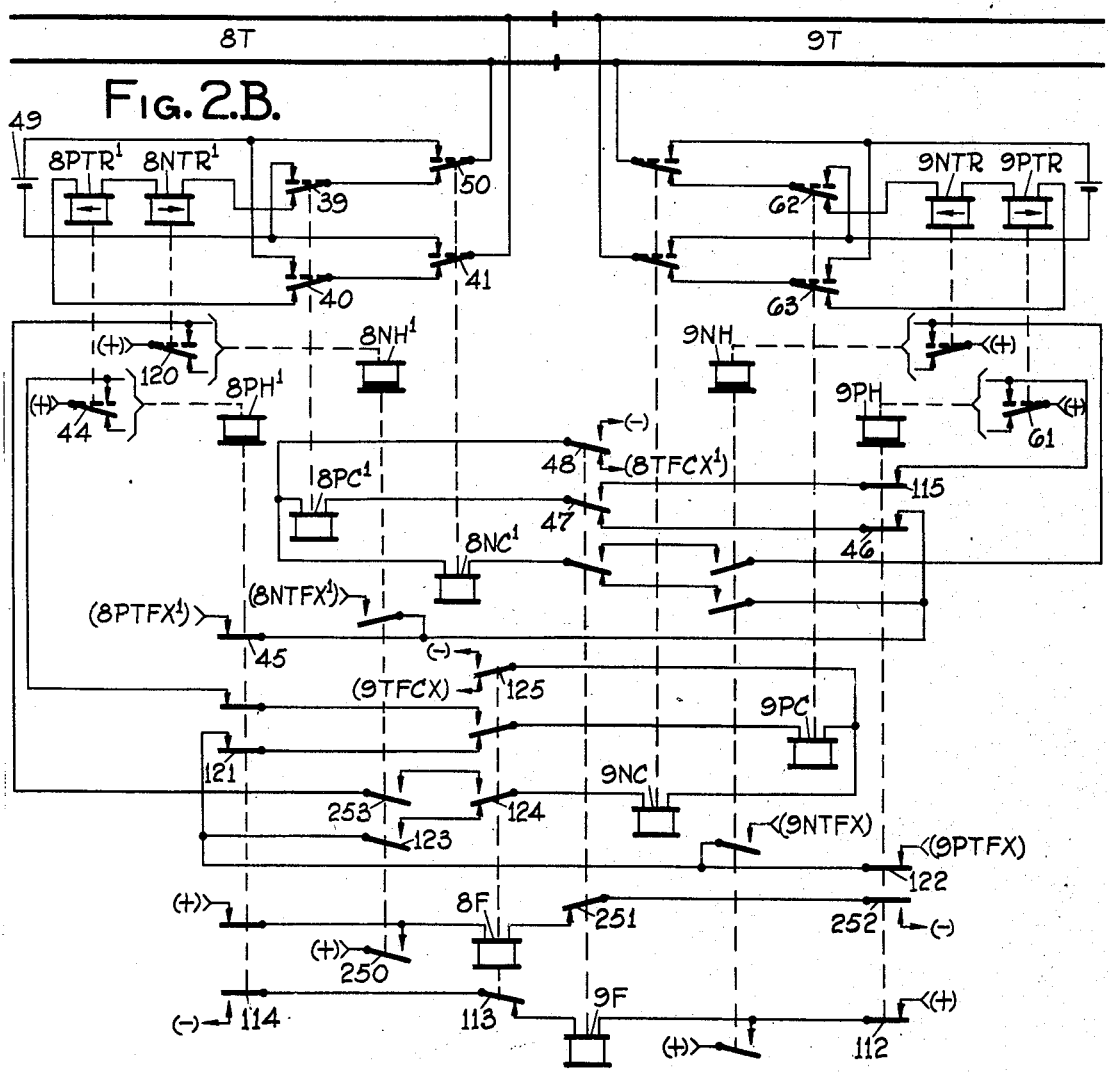
Fig. 2.B.

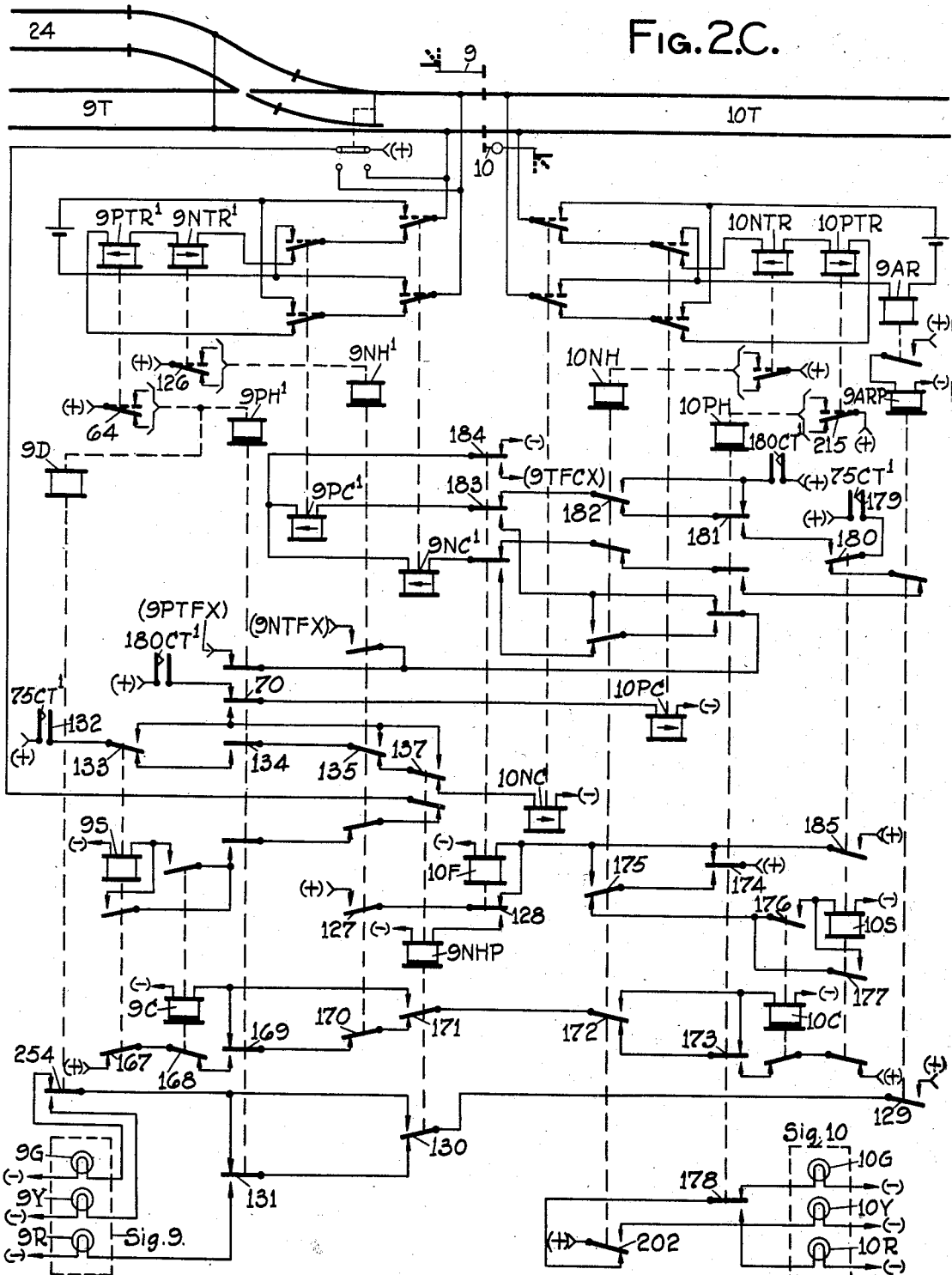

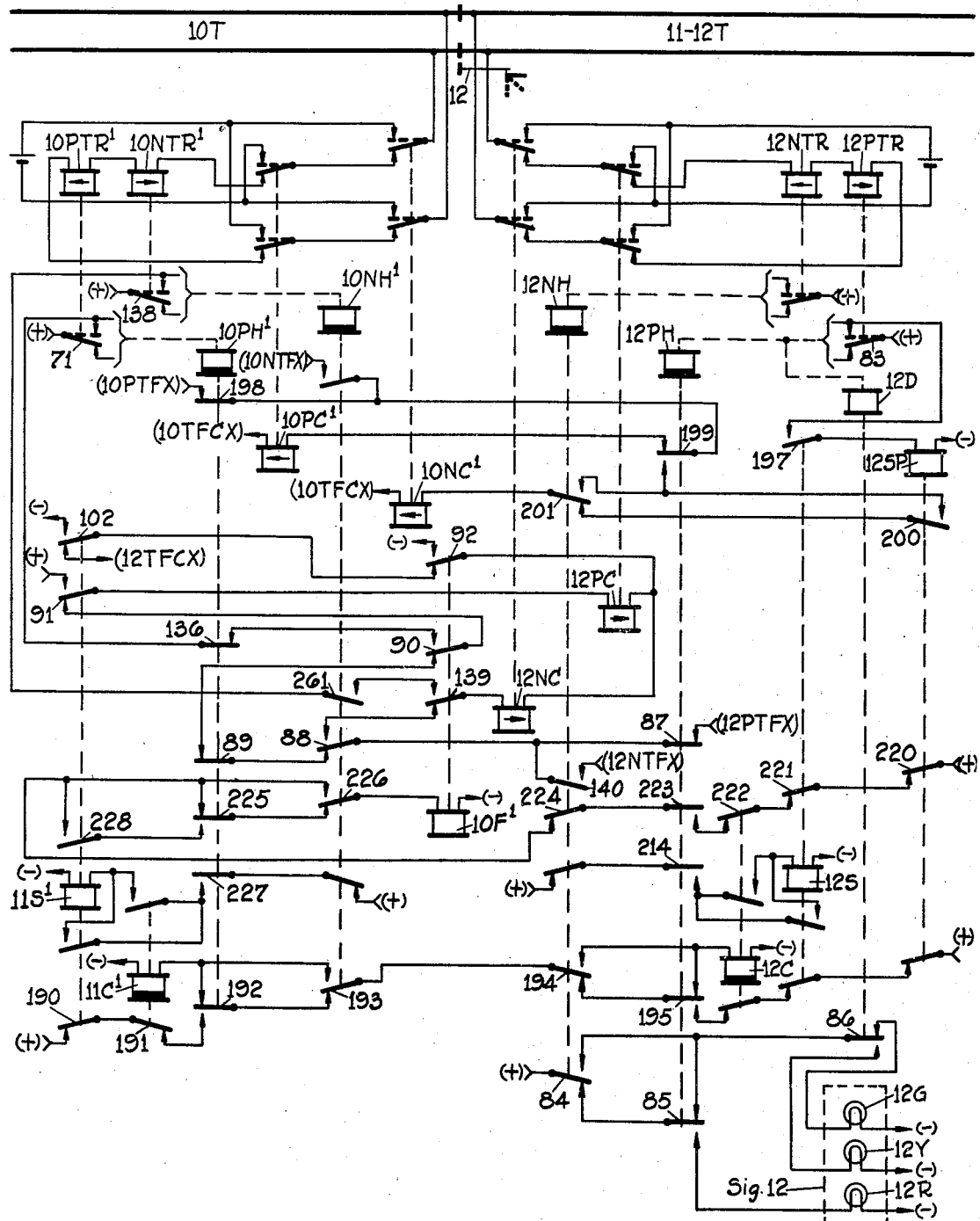

July 28, 1942.  T. J. JUDGE  2,291,579
CODED TRACK CIRCUIT SIGNALING SYSTEM
Filed May 2, 1941  9 Sheets-Sheet 7
Fig. 2.E.
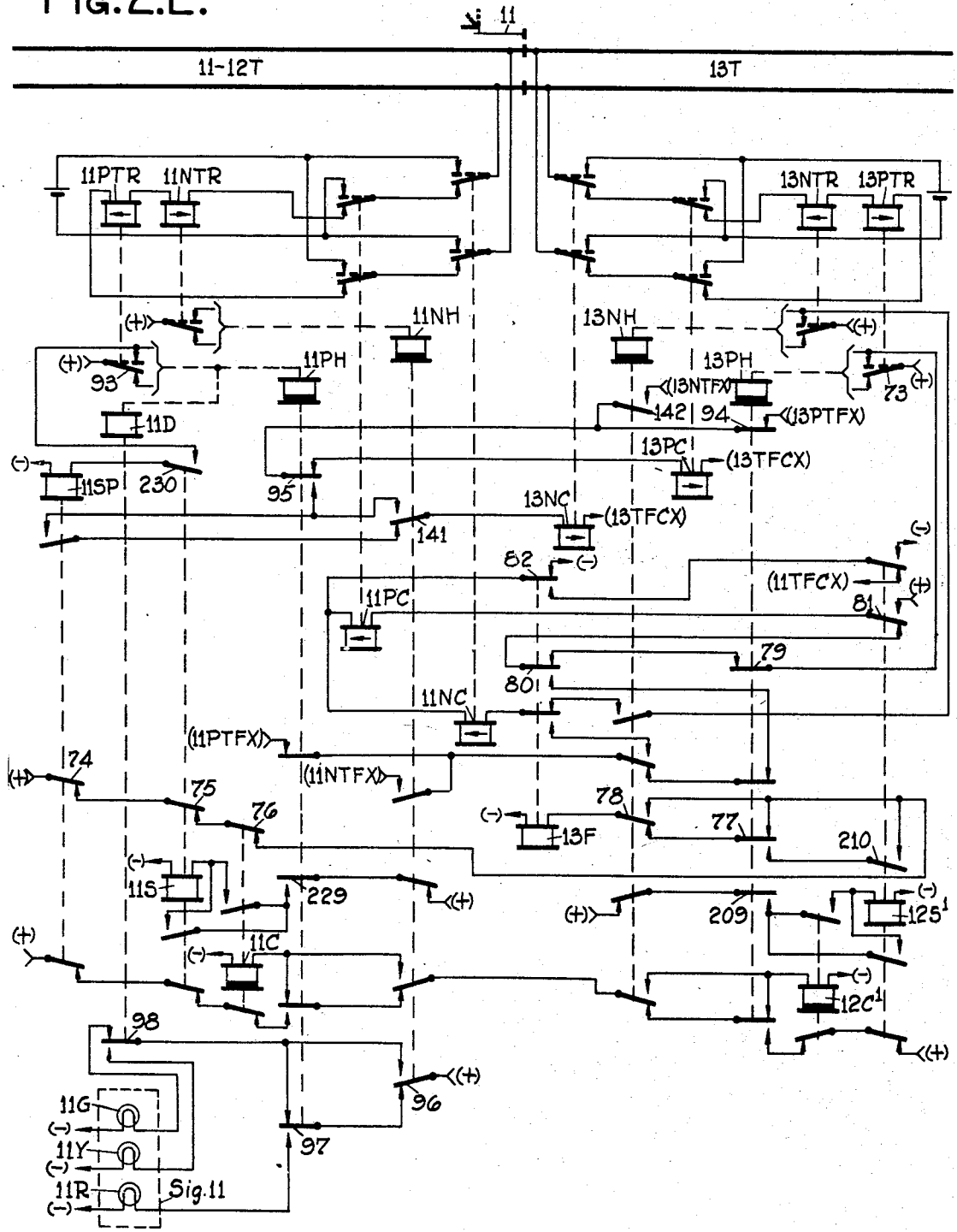
INVENTOR
T. J. Judge,
BY Neil D. Preston
his ATTORNEY

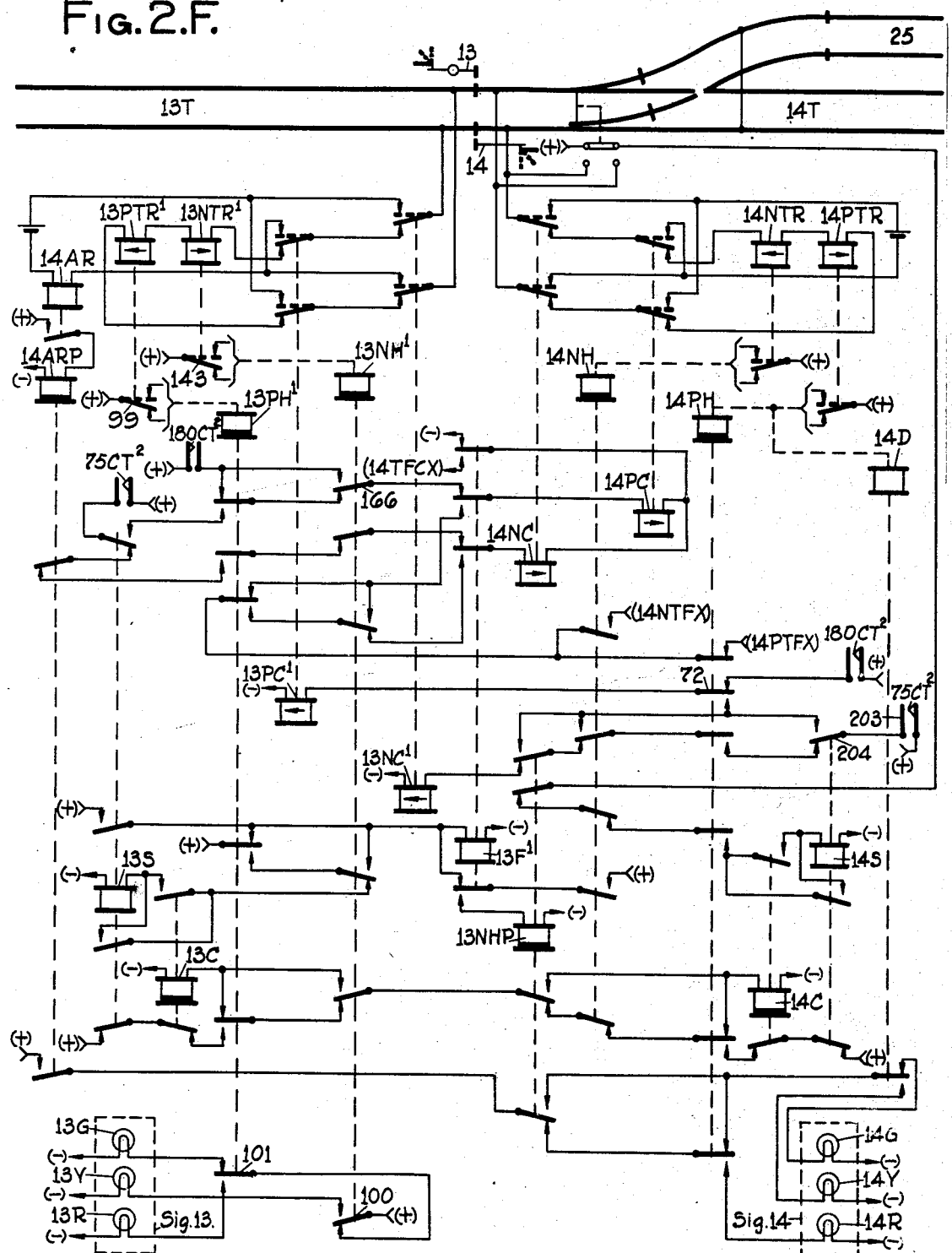
Fig. 2.F.

July 28, 1942.  T. J. JUDGE  2,291,579
CODED TRACK CIRCUIT SIGNALING SYSTEM
Filed May 2, 1941   9 Sheets-Sheet 9

INVENTOR
T. J. Judge,
BY Neil W. Preston,
his ATTORNEY

Patented July 28, 1942

2,291,579

UNITED STATES PATENT OFFICE 2,291,579

CODED TRACK CIRCUIT SIGNALING SYSTEM

Thomas J. Judge, Rochester, N. Y., assignor to General Railway Signal Company, Rochester, N. Y.

Application May 2, 1941, Serial No. 391,453

29 Claims. (Cl. 246—33)

This invention relates to signaling systems for railroads, and it more particularly pertains to block signaling systems of the absolute permissive block type for single track railroads employing coded track circuits.

The type of absolute permissive block signaling systems commonly used in practice is more particularly adapted to single track railroads having a considerable distance between sidings. This is true, unless extra line wires are provided for overlap controls, because at least three blocks must be included between sidings, and the blocks must be long enough so that two opposing trains having entered a stretch of track between sidings simultaneously will have braking distance beyond the intermediate danger signals they encounter. This is required, because, under such conditions, the simultaneous entry of opposing trains into a stretch of track between sidings allows each train to receive a clear signal upon entrance into such stretch of track, as the passage of an entering signal is essential to effect the tumbledown of the opposing signals. The increased speed of the present trains and other traffic conditions presents the problem of providing safe signaling for short stretches of track between sidings without requiring extra line wires for overlap control.

An object of the present invention is to provide an absolute permissive block signaling system employing coded track circuits, without the use of line wires between signal locations, that is readily adaptable to short as well as long stretches of single track. The present invention provides that the presence of a train in approach to the leaving or head block signal at the end of a siding will cause the opposing leaving signal at the next siding to indicate caution, a leaving signal being considered as the signal governing passage of a train from a siding section. Such condition exists for both directions of traffic. In other words, the present invention provides by means of coded track circuit controls that the most favorable indication to be encountered by opposing trains upon simultaneous entry to a stretch of single track between sidings is caution. Thus, each train has a warning that it must be prepared to stop short of the first intermediate signal. By such signaling arrangement, safe opposing train operation can be provided for a stretch of track between sidings that is as short as double braking distance in length.

Another object of the present invention is to provide overlap controls for certain signals in a coded absolute permissive block signaling system without the use of line wires. Such overlap controls greatly facilitate the proper location of signals along short stretches of track between sidings.

The system according to the present invention provides a coded track circuit for each of the track sections having a code transmitter and a code receiver at each end thereof. For the purpose of description of the present invention, a code transmitted directly in accordance with an impulse producing device is called a "driven" code, and a code having its characters transmitted during the deenergized or "off" periods of a driven code for that track circuit is called an "inverse" code. Thus, by transmitting in a track section a selected driven code in one direction and a selected inverse code in the opposite direction, signal controls for both directions of traffic can be simultaneously transmitted.

Another object of the present invention is to provide the required number of distinctive driven codes by varying the rate of impulse transmission, and by varying the polarity of the impulses employed. Inasmuch as the inverse code rate is dependent upon the driven code rate for that track section, the inverse codes are distinctive primarily by the polarity of the impulses used.

Another object of the present invention, due to there being a greater selection of driven codes available than inverse codes, is to provide in certain of the track sections means for reversing the direction of transmission of driven codes in accordance with the direction of approaching traffic. Such reversal provides that the opposing signals at the ends of a block can each have their signal indications governed in accordance with the reception of a driven code when a train is approaching such signal.

Other objects, purposes and characteristic features of the present invention will be in part obvious from the accompanying drawings and in part pointed out as the description of the invention progresses.

Figure 3:
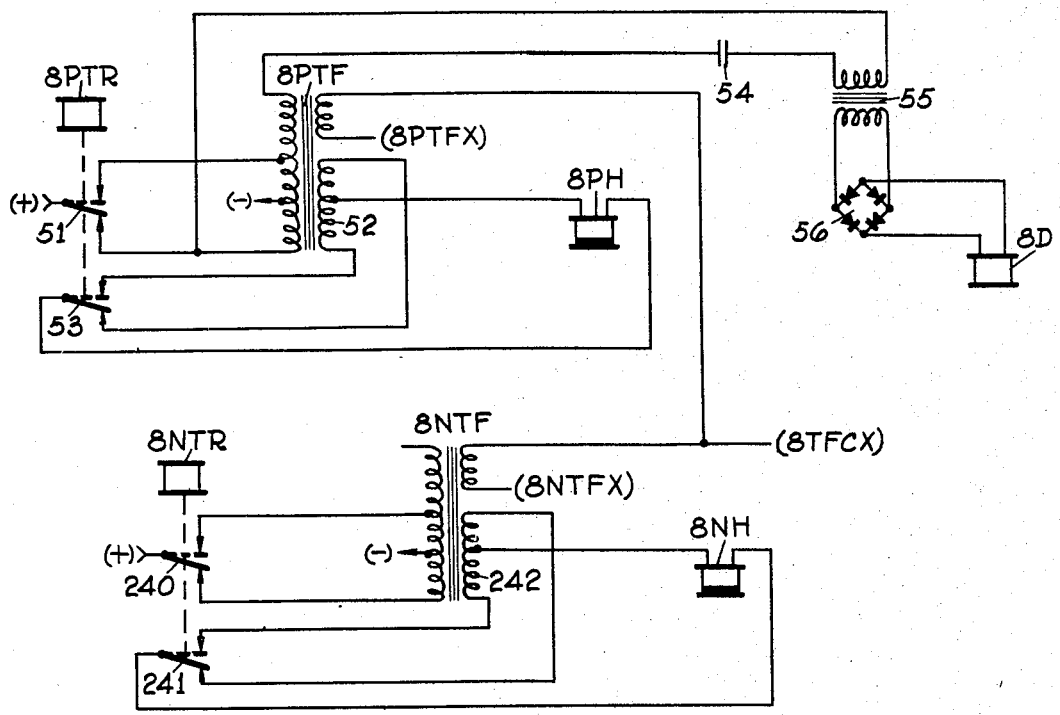
Figure 4:
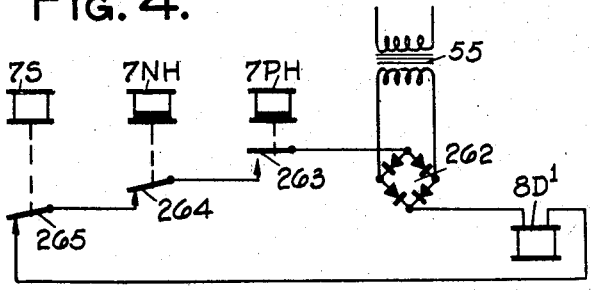

In describing the present invention in detail, reference will be made to the accompanying drawings in which corresponding reference characters are used to designate corresponding parts throughout the various figures, in which like letter reference characters are used to designate parts having similar features and functions, such parts being generally made distinctive by reason of preceding numerals or by exponents indicative of the particular location of devices with which such parts are associated, and in which:

Figs. 1A to 1J inclusive, show diagrammatically the codes transmitted through the track circuits for the control of the various signals for this embodiment of the present invention in accordance with various assumed traffic conditions;

Figs. 2A to 2F inclusive, when placed side by side, illustrate in detail the manner in which the present invention is applied to the control of signals for a typical stretch of track extending between two sidings, and for the entering and leaving signals at a siding;

Fig. 3 illustrates in detail a typical manner in which the decoding of the codes received at the end of a track circuit is effected; and Fig. 4 illustrates in a typical manner for a particular signal location how the control of the signal can be modified from the form illustrated in Fig. 3.

The illustrations have been arranged to show diagrammatically in a simplified manner the circuits employed by the present invention in order to facilitate the disclosure thereof as to the mode of operation and principles involved, rather than attempting to show the specific construction and arrangement of parts that would be employed in practice. Thus, symbols are employed in the conventional manner for relays and other devices, and symbols are used for connections to sources of energy rather than illustrating in detail the connections to batteries, transformers, or other sources of energy as would be provided in practice.

The symbols (+) and (—) are employed to indicate the connection to the positive and negative terminals respectively of suitable batteries or other sources of direct current, and the circuits with which those symbols are used always have current flowing in the same direction. The symbols PTFX, NTFX and TFCX are used to illustrate connections to the secondary windings of transformers PTF and NTF (provided with preceding numerals indicative of the track circuit with which such transformers are associated) as typically illustrated in Fig. 3. These symbols are used to simplify the drawings as shown in Figs. 2A to 2F inclusive in that the transformer connections PTFX (provided with proper preceding numerals) indicate connections to the secondary windings of transformers energized upon reception of positive track circuit impulses, the reference characters NTFX (provided with preceding numerals) indicate connections to the secondary winding of transformers NTF energized upon the reception of negative code impulses, and the reference characters TFCX (provided with preceding numerals) indicate common connections between the secondary windings of the transformers PTF and NTF for the particular end of the track circuit involved.

For the purpose of simplifying the description of the present invention as to the utility and mode of operation of certain types of devices, reference is made from time to time to functions common to all parts of a similar character by use of letter reference characters common to such parts without preceding numerals or exponents. It is to be understood that such a reference applies to any parts designated in the drawings by reference characters that are similar except for the preceding numerals or the exponents associated therewith.

With reference to Fig. 1A, the trackway for this embodiment of the present invention comprises a main stretch of track divided into blocks and having passing sidings 23, 24, 25 and 26 spaced at short distances apart from each other by stretches of single track. Although in this embodiment of the present invention three track sections are included between each of the sidings, it is to be understood that a greater number of track sections can be provided in accordance with the requirements of practice. It is also to be understood that the system provided by the present invention is adaptable to a stretch of track between sidings having only two blocks, there being a single double intermediate signal location between the sidings. It is believed to be readily apparent to those familiar with the art how the circuits shown and described in this embodiment of the present invention can be modified to satisfy such different signal arrangements as may be required in railway practice.

With reference to Figs. 2A to 2F inclusive, it will be noted that the circuits are illustrated in detail for a portion of the trackway which is shown in Fig. 1A, such portion including track sections 7T, 8T, 9T, 10T, 11—12T, 13T and 14T. These circuits show in detail how the signal controls are communicated through the siding sections, and through a stretch of single track between sidings.

It is to be understood that the passing sidings are constructed in the usual manner, the track switches being provided with the usual type of switch circuit controllers and being properly bonded to provide fouling protection. The siding section formed by the passing track itself is in this embodiment a "dead" section in that it has no track circuit.

The signals for governing traffic in both directions along the trackway are located in accordance with the usual practice, there being entering and leaving signals at each end of each of the passing sidings, and there being intermediate signals along the trackway between the sidings. For example, with reference to Fig. 2A, the west bound signal 7 is a leaving signal for the siding 24, and the east bound signal 8 is an entering signal for the siding 24. In a similar manner the signals 9 and 10 are entering and leaving signals respectively for the right-hand end of the siding 24. West and east bound signals 11 and 12 respectively are intermediate signals in the stretch of track between sidings 24 and 25, commonly known in practice as staggered intermediate signals.

The symbols used in the diagrams in the accompanying drawings for the signals located along the trackway are to be considered as conventional symbols indicative of the indications the various signals can display, rather than indicative of the particular type of signals employed in practice, as it is to be understood that various types of signals such, for example, as semaphore, searchlight, color light signals having individual color lamp units, and position light signals can be used in accordance with the requirements of practice. For this embodiment of the present invention the signals employed are of the color light type having individual color lamp units. Each signal has a green lamp for indicating clear, a yellow lamp for indicating caution, and a red lamp for indicating danger or stop.

Each of the track sections illustrated in Fig. 1A has a track circuit with a code transmitter and a code receiver at each end thereof. The code transmitter and code receiver in each case is operable to distinctively transmit and receive track circuit codes of different polarities. Thus, each track circuit includes at each end thereof a positive and negative code transmitter relay PC and NC respectively and a positive and a negative code following relay PTR, and NTR respectively. The code following relays PTR and NTR have a polar magnetic structure so arranged that those relays are active only upon the reception of impulses of the particular polarity which such relays are intended to receive, relays PTR being operable to receive positive impulses in the track circuits, and the relays NTR being operable to receive impulses of negative polarity. For purpose of description of the present invention the polarity of energization of any track circuit will be considered as the polarity of the track battery applied to the lower rail of the track section.

The pulsing of each relay PTR causes the sustaining of energization for a relay PH associated therewith. Each relay PH is energized in accordance with the pulsing of a contact of its associate relay PTR through the medium of a transformer PTF which provides proper means for detecting the presence of a code in the track circuit. Such means of energization of each relay PH is provided as typically shown in detail in Fig. 3. In a similar manner the pulsing of a relay NTR causes a relay NH to be picked up through the medium of a transformer and rectifying means as illustrated in Fig. 3. Certain of the signal locations also have an additional decoding relay D which is energized by a circuit tuned to a rate of 180 impulses per minute, such circuit means is energized in accordance with the pulsing of a contact of the positive code following relay PTR for the track section with which such D relay is associated.

A relay F is provided for certain of the code transmitters in order to govern the direction of code transmission through the track section with which it is associated.

A stick relay S and a control relay C are provided for each signal for properly selecting the codes to be transmitted in accordance with the direction of the passage of trains.

At the ends of track sections where a driven code is to be transmitted at the times selected, code forming devices such as oscillators are provided. An oscillator suitable for the purpose is shown, for example, in the patent to P. N. Bossart, Patent No. 1,858,876, dated May 17, 1932. The contacts shown in Figs. 2A to 2F inclusive bearing reference characters 180CT are to be understood as contacts of an oscillator producing impulses at a rate of 180 impulses per minute, and contacts designated by the reference characters 75CT are to be understood as contacts of an oscillator producing impulses at a rate of 75 impulses per minute. The impulses formed by such oscillatory means are preferably of such lengths as to provide "off" and "on" periods of relatively equal length. It is to be understood that other impulse forming devices such as motor driven coders could as well be used.

Each of the entering signals has an approach relay AR connected in the track circuit in the rear of such signal and arranged so as to become active only when increased current flows in the track circuit due to the presence of a train. A slow acting approach repeater relay ARP is provided for each approach relay AR such relay having enough slow action to be maintained steadily picked up in accordance with the pulsing of the approach relay AR with which it is associated.

Having considered the general organization of the system for this embodiment of the present invention, it is believed that the mode of operation of the system will best be understood upon considering certain typical operating conditions under various conditions of traffic.

Operation

*General.*—In order that an understanding may be had as to the general mode of operation of the system without considering in detail the arrangement of circuits for providing such operation, consideration will be given to the various traffic conditions illustrated in Figs. 1A to 1J inclusive, and detail consideration will be hereinafter included as to the circuits which provide the desired mode of operation.

With reference to Fig. 1A, it will be noted that the signals are normally clear for both directions of traffic, and that driven codes are transmitted in both directions away from the head block signal locations at the ends of each siding. A driven code is normally transmitted through the center track section of each stretch of track between sidings from right to left. The driven codes are illustrated by solid arrows pointing in the direction of code transmission, and the inverse codes are represented by broken arrows pointing in the direction of code transmission. The overlap control reference lines 30 for the leaving signals 4, 7, 10, 13, 16 and 19 are provided in order to illustrate diagrammatically that the control sections for such leaving signals extends two track sections in advance thereof. The effects of such control will be hereinafter considered with reference to Figs. 1D and 1E.

Although the entering signals 2, 3, 8, 9, 14, 15, 20 and 21 have been illustrated as being normally clear, the signal lamps are normally dark because of the provision of approach lighting for such signals. Such approach lighting, however, has not been taken into consideration in the diagrams of Figs. 1A to 1J inclusive, as it is believed to be more desirable to show that the signal has its control apparatus conditioned so that it can be cleared when approach lighting becomes effective.

It will be noted in Fig. 1A, that the driven codes transmitted under normal conditions are all at a 180 rate and are of positive polarity, while the inverse codes transmitted under normal conditions are all of positive polarity. The organization of the system is such, that the passage of a train causes the transmission of driven codes in such a direction in advance thereof as to cause each signal governing passage of the train to be cleared in accordance with the reception of a driven code except for the leaving signals which are governed only by inverse codes.

Figure 1B:
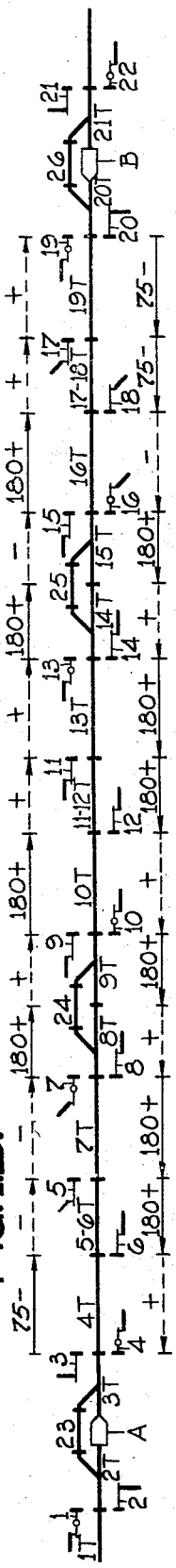

With reference to Fig. 1B, it will be noted that the presence of the train A within a siding section for the siding 23 changes the rate of transmission through the track section 4T to a 75— code. The transmission of a 75— code through such track section not only causes the signal 5 to display a caution indication, but it also changes the polarity of the inverse code transmitted to signal 7 so as to cause such signal to also display a caution indication. A similar condition will be found to exist for the west bound train B.

Figure 1C:
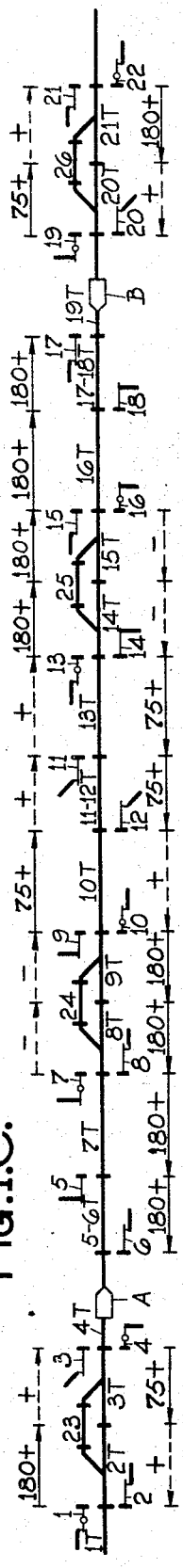

With reference to Fig. 1C, the passage of the train A past the signal 4, which has been cleared in accordance with the reception of a positive inverse code, causes the tumble-down characteristic of absolute permissive block signaling systems by removing the inverse code transmitted for the control of signals 5 and 7 and thus causing such signals to display danger indications. The removal of the inverse code transmitted for the control of signal 7 also causes the reversal of the direction of transmission of the code through the track section 8T. When such reversal is effected, the signal 8 is cleared by the reception of a 180 driven code, and an inverse code of negative polarity is transmitted to the signal 9 to cause such signal to display a danger indication, and in accordance therewith to cause the signal 11 to be conditioned to display a caution indication by the transmission of a 75+ code for its control. It will be noted that the selection for transmission to signal 11 of the 75+ code rather than a 75— code does not disturb the transmission of an inverse code of positive impulses for the clearing of signal 13. This condition can be compared to the condition illustrated in Fig. 1B in which the selection for transmission in the rear of signal 3 of a 75— code changes the polarity of transmission of the inverse code for the control of signal 7 and thereby causes the signal 7 to display a caution indication. It will be noted with reference to Figs. 1D and 1E that the progress of the east bound train A through the track sections 5—6T and 7T does not disturb the codes transmitted for the control of the opposing signals 9, 11 and 13. The mode of operation just described with reference to Figs. 1C, 1D and 1E, however, is changed somewhat dependent upon the approach of opposing trains as will be hereinafter considered with reference to Figs. 1G, 1H, 1I and 1J.

Figures 1D, 1E:
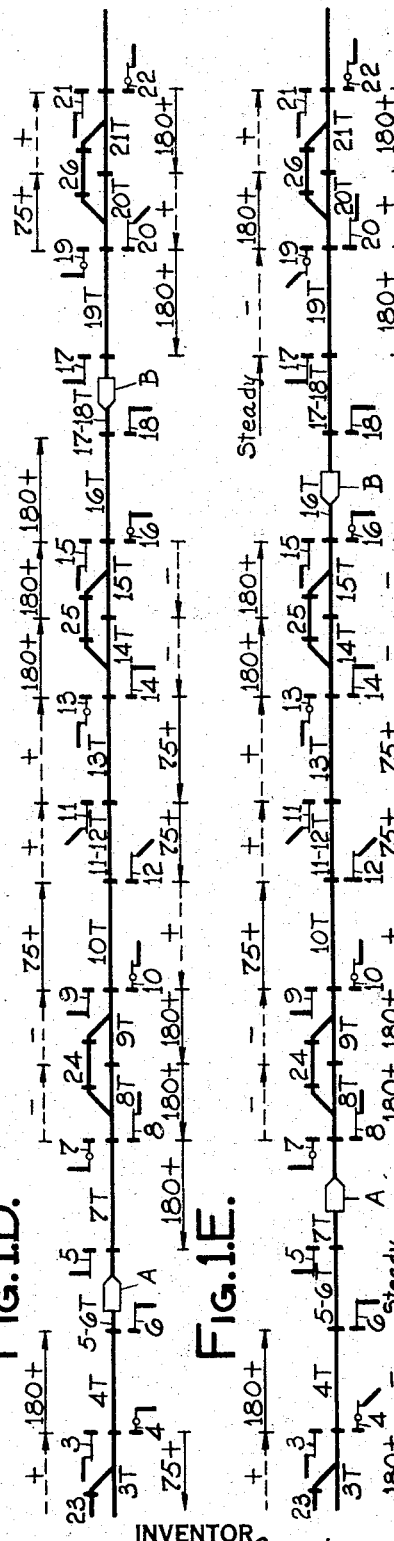

With reference to Figs. 1D and 1E it is illustrated how the overlap control for signal 4 is provided. That is, with the train A in track section 5—6T, the signal 4 remains at stop, because there is no code transmitted for clearing such signal. However, when the train A has left the track section 5—6T as shown in Fig. 1E, the steady energization of track section 5—6T causes the transmission of a negative inverse code through the track section 4T for the caution indication of signal 4.

It will be readily apparent that a similar mode of operation is provided in accordance with the passage of the west bound train B through the track layout as illustrated in Figs. 1B, 1C, 1D and 1E, similar codes being transmitted under similar traffic conditions to those described for the passage of the train A. One slight difference exists, however, in the passage of the west bound train B as compared to the passage of the east bound train A in that reversal in direction of driven code transmission becomes effective for the center track section in the stretch of track between sidings as soon as the west bound train passes the leaving signal governing passage through such stretch of track. Thus, for example, the entrance of the train B into the track section 19T as illustrated in Fig. 1C removes the driven code being transmitted from right to left through the track section 17—18T, and establishes the opposite direction of transmission of a code through such track section in order that the signal 17 may be cleared in accordance with the reception of a 180+ driven code.

Figure 1F:
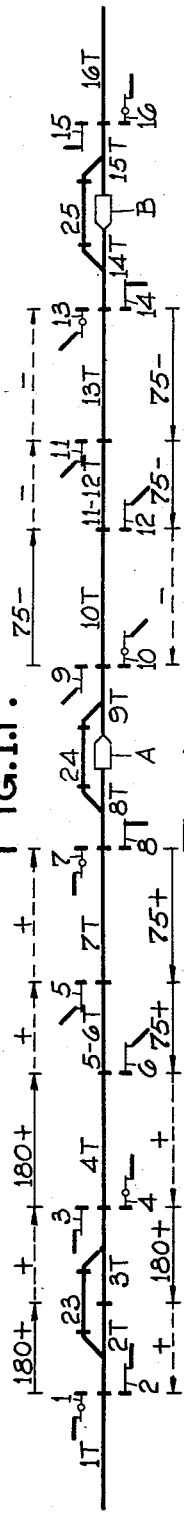

It will be noted with reference to Fig. 1E that the approach to each other of the two opposing trains A and B has not been such as to cause the entering signals immediately in advance of the train to display caution indications. However, with reference to Fig. 1F, it will be noted that the presence of the trains A and B in siding sections for adjacent sidings 24 and 25 causes the leaving signals 10 and 13 to display caution rather than clear indications. The codes transmitted to provide such indications are similar to those illustrated in Fig. 1B for the control of opposing signals where the passage of east and west bound trains A and B are considered independently. It is by this arrangement, that safety can be provided where short single track sections between sidings are concerned because the entrance of trains A and B simultaneously to the stretch of single track between sidings 24 and 25 could be effected only under conditions where both trains A and B would encounter caution indications at the leaving signals. Such indications would be effective to warn the trainmen of the opposing trains that they must be prepared to stop short of the first intermediate signal to be encountered. By such arrangement, it would even be possible to provide safe operation for a short stretch of track between sidings having only two blocks, and one double intermediate signal location between the sidings. With the signaling arrangement as shown, however, the track section 11—12T can be as short as desirable in practice. This shortening of the track section between staggered intermediate signals under the conditions as illustrated in Fig. 1F can be compared to the absolute permissive block signaling systems most commonly in use which would provide, under the traffic conditions illustrated in Fig. 1F, that the leaving signals 10 and 13 would be clear, and such being the case, double braking distance would be required in the track section 11—12T in order that the trains A and B would have sufficient braking distance beyond the intermediate signals 11 and 12 in case such trains should enter the stretch of track between sidings 24 and 25 substantially simultaneously. In case of simultaneous entry in accordance with the present invention into the stretch of track between sidings 24 and 25, the effective braking distance for the opposing trains begins upon the passage of such trains past the leaving signals which are at caution.

Figure 1G:
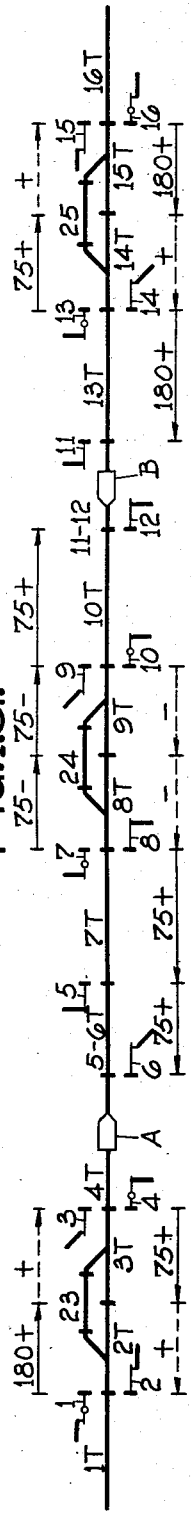
Figure 1H:
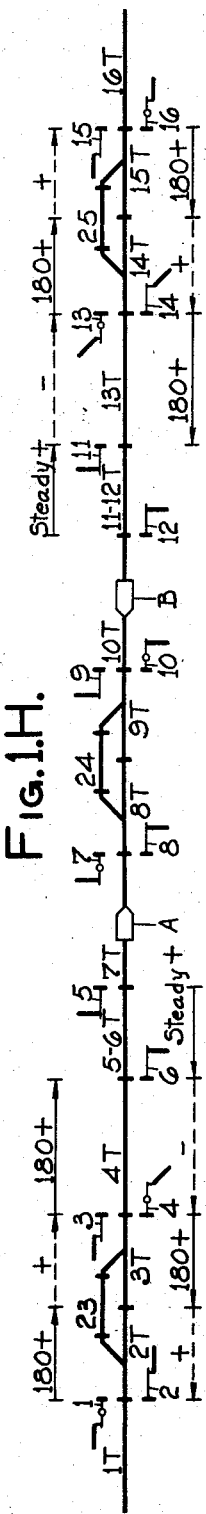

With reference to Fig. 1G, when two trains are approaching a siding for a meet, the first train to approach the siding section, which is assumed to be the train B, will encounter a caution entering signal as displayed by signal 9, if the opposing train A is not in immediate approach of the entering signal 8. This condition is effective because the entrance of the train B into the stretch of single track between the sidings 24 and 25 establishes the direction of code transmission through the siding sections 8T and 9T; and, under the conditions illustrated, a 75— code is transmitted through such siding sections to cause the signal 9 to display a caution indication. The signal 9, however, is put to danger upon the entrance of the train A into the track section 7T, the entrance of train A into that track section being effective as shown in Fig. 1H to remove the code being transmitted through the siding sections 8T and 9T. Such mode of operation provides what is commonly called a one-block overlap control for the entering signal 9 in that such signal is put to danger only after entrance of the opposing train A into the track section 7T. This condition can be compared to the effective overlap control for signal 8 which, in Fig. 1G, extends through the entire single track section between the sidings 24 and 25. This is true because the entrance of the train B into the track section 13T in reversing the direction of code transmission through the track sections 8T and 9T causes the signal 8 to display a danger indication. The negative inverse code transmitted through the track sections 8T and 9T under such conditions to signal 8, is effective primarily to maintain the transmission of a 75+ code for the control of the signal 6 as compared to a 75− code which would be transmitted if such negative inverse code were not present. Thus, it will be seen with reference to Figs. 1G and 1H that the system provided by the present invention governs the extent of effective overlap control for the entering signals in accordance with the sequence of approach of opposing trains.

Figure 1I:
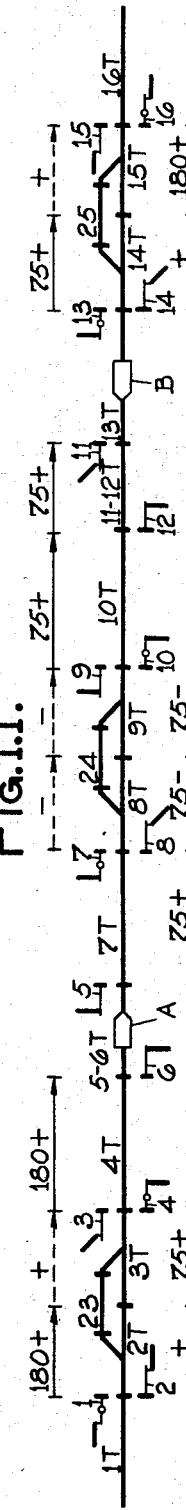
Figure 1J:
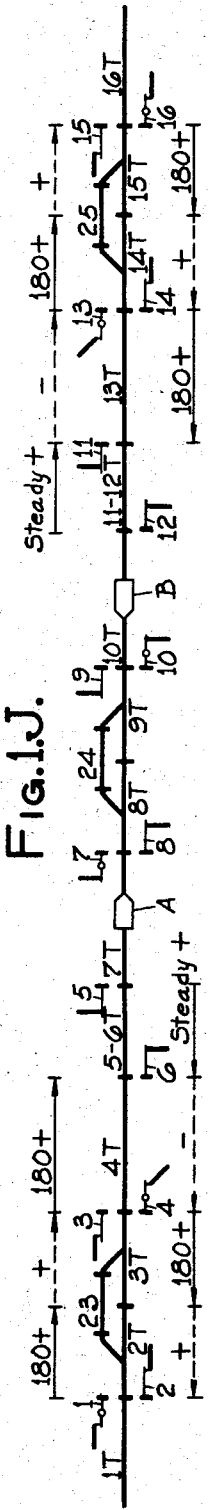

A similar condition to that illustrated in Figs. 1G and 1H in which a single block overlap is provided for the signal 9, is effective for the signal 8 as illustrated in Figs. 1I and 1J where the entrance of train A into the stretch of single track between sidings 23 and 24 is assumed to have been effective prior to the entrance of the train B into the stretch of single track between the sidings 24 and 25.

*Normal conditions.*—Normal conditions of the system are to be understood as those conditions which exist when the trackway is unoccupied by trains. It is to these conditions that the system is restored after the passage of a train in either direction, if the system is not otherwise affected by another train.

Under normal conditions, a 180+ code is transmitted from the head block location of signals 7 and 8 through the track sections 7T and 8T. For transmission through the track section 8T, the relay 8PC (see Fig. 2A) pulses at a 180 rate in accordance with the energization for each impulse produced by the coder or oscillator 180CT of a circuit extending from (+), including contact 31 of oscillator 180CT, front contact 32 of relay 7PH, back contact 33 of relay 7NH, front contact 34 of relay 7F, winding of relay 8PC, and front contact 35 of relay 7F, to (−). Each time the relay 8PC is picked up a circuit is closed to energize the track circuit for track section 8T with positive polarity for an "on" period of the driven code, extending from the positive terminal of track battery 36, including front contact 37 of relay 8PC, back contact 38 of relay 8NC, lower rail of track section 8T, back contact 50 (see Fig. 2B) of relay 8NC¹, back contact 39 of relay 8PC¹, winding of relay 8NTR¹, winding of relay 8PTR¹, back contact 40 of relay 8PC¹, back contact 41 of relay 8NC¹, upper rail of track section 8T, back contact 42 (see Fig. 2A) of relay 8NC, and front contact 43 of relay 8PC, to the negative terminal of track battery 36.

At the right-hand end of track section 8T the code following track relay 8PTR¹ follows the 180+ driven code being transmitted through that track section, but the relay 8NTR¹ is inactive because of its polar characteristics. The pulsing of contact 44 of relay 8PTR¹ causes the relay 8PH¹ to be maintained picked up, such relay being sufficiently slow acting to remain picked up during the "off" periods of any driven code received. The relay 8PH¹ is energized from the secondary winding of a transformer TF (not shown) in a manner similar to that shown for the energization of the relay 8PH in Fig. 3 to be hereinafter described.

In accordance with the pulsing of the contact 44 of relay 8PTR¹, energy is supplied from a secondary winding of a transformer TF energized by such contact as typically shown in Fig. 3 for the transformer 8PTF, and the energization of that secondary winding due to collapse of flux each time the front contact 44 of relay 8PTR¹ is opened is of such a polarity as to be effective to cause the picking up of the relay 8PC¹ for the transmission of a (+) impulse of an inverse code through the track section 8T. Inasmuch as the energization of such secondary winding is effective with the proper polarity only momentarily upon the opening of front contact 44 of relay 8PTR¹, the relay 8PC¹ will be picked up only for a short period of time sufficient to cause the transmission of an impulse of an inverse code during each "off" period of the driven code received at the right-hand end of track section 8T. In order to simplify the drawings, connection to the terminals of the secondary windings of the transformers is illustrated in the conventional written circuit manner. It is to be understood that the energy supplied for the transmission of an inverse code by the secondary winding of a transformer TF as illustrated in a written circuit manner for any of the track sections corresponds to that illustrated and hereinafter described as typical with reference to Fig. 3 in connection with the decoding of impulses received at the left-hand end of track section 8T.

Therefore, the opening of front contact 44 of relay 8PTR¹ at the end of each "on" period of the driven code received through the track section 8T causes the momentary picking up of the relay 8PC¹ (see Fig. 2B) for the transmission of an inverse code impulse by the energization of a circuit extending from a terminal of the secondary winding of the decoding transformer designated as (8PTFX¹) including front contact 45 of relay 8PH¹, front contact 46 of relay 9PH, back contact 47 of relay 9F, winding of relay 8PC¹, and back contact 48 of relay 9F to the opposite terminal of the secondary winding of the transformer designated as (8TFCX¹).

At the left-hand end of track section 8T the relay 8PTR (see Fig. 2A) is pulsed upon the reception of an inverse code of positive polarity in accordance with the energization during each "off" period of the driven code transmitted from that end of the track section of a circuit extending from the positive terminal of track battery 49 (see Fig. 2B) including front contact 39 of relay 8PC¹, back contact 50 of relay 8NC¹, lower rail of track section 8T, back contact 38 (see Fig. 2A) of relay 8NC, back contact 37 of relay 8PC, winding of relay 8NTR, winding of relay 8PTR, back contact 43 of relay 8PC, back contact 42 of relay 8NC, upper rail of track section 8T, back contact 41 (see Fig. 2B) of relay 8NC¹, and front contact 40 of relay 8PC¹, to the negative terminal of track battery 49.

The pulsing of contact 51 of relay 8PTR upon the reception of the positive inverse code causes the relay 8PH to be maintained energized, and causes the energization of the relay 8D because the code received is at a 180 rate. With reference to Fig. 3, the pulsing of contact 51 of relay 8PTR alternately energizes the primary winding of the transformer 8PTF with first one polarity and then the other, and causes an alternating voltage to be induced in the secondary windings of such transformer. The secondary winding 52 provides for the energization of the relay 8PH, and the contact 53 included in the circuit for relay 8PH rectifies the alternating current induced in the secondary winding 52 so that the relay 8PH can be a direct current relay. This means of energizing an H relay in accordance with the pulsing of a contact of a code following relay is well known to those familiar with the art, and is disclosed more fully in my prior application, Ser. No. 365,669, filed November 14, 1940. Each time reversal of the flux in the transformer 8PTF is effective, the tuned circuit including the primary winding of transformer 8PTF, condenser 54, and the primary winding of transformer 55, is active to cause sufficient alternating current to be induced in the secondary winding of transformer 55 to allow the picking up of the relay 8D through the medium of the rectifier 56, only if the code being received is at a rate of 180 impulses per minute. The circuits just described for the control of the relays 8PH and 8D, and the circuit shown for the relay 8NH which is similar to the circuit described for relay 8PH, are to be considered as typical of the circuits not shown in detail which are to be understood to be provided for each of the relays PH, NH and D employed in this embodiment of the present invention.

In accordance with the picked up condition of the relays 8D and 8PH, a circuit is conditioned for the energization of the green lamp 8G (see Fig. 2A) of signal 8, depending upon the presence of a train in approach of such signal to provide approach lighting. If approach lighting were effective in accordance with the picking up of the approach repeater relay 8ARP, the lamp 8G would be illuminated by the energization of a circuit extending from (+), including front contact 57 of relay 8ARP, back contact 58 of relay 7NHP, front contact 59 of relay 8PH, front contact 60 of relay 8D, and lamp 8G, to (—).

In a similar manner to that described in detail for the codes transmitted through the track section 8T, a driven code is transmitted from right to left through the track section 9T to cause the relay 9PTR (see Fig. 2B) to be active to pulse contact 61 for maintaining the relay 9PH picked up. In accordance with the picked up condition of the relay 8PH¹, an inverse code of positive polarity is transmitted through the track section 9T for the control of signal 9 in a manner similar to that described in detail for the transmission of an inverse code through the track section 8T for the control of signal 8, such transmission being effective in accordance with the pulsing of contacts 62 and 63 of relay 9PC. Upon reception of an inverse code at the right-hand end of track section 9T of positive polarity at a rate of 180 impulses per minute, the pulsing of contact 64 of relay 9PTR¹ (see Fig. 2C) is effective to maintain the relays 9PH¹ and 9D in a picked up position. Thus, the signal 9 is conditioned to have its green lamp 9G illuminated, dependent upon approach lighting, in a manner similar to that described in detail with reference to the circuit for the illumination of the lamp 8G of signal 8.

With reference to Fig. 2A it will be noted that the relay 7PC is normally active to transmit a driven code of positive polarity at a 180 rate through the track section 7T in accordance with its energization by an obvious circuit during each impulse formed by the closing of contact 65 of the oscillator 180CT. The transformer of a 180+ driven code through the track section 7T is effective in accordance with the energization of the track circuit for that track section during each "on" period in a manner similar to that which has been described in detail with reference to the track circuit for the track section 8T.

Upon the reception at the left-hand end of track section 7T of the 180+ code, under normal conditions, an inverse code of positive polarity is transmitted back through the track section 7T for the clearing of signal 7 in a manner similar to that to be hereinafter described in which an inverse code is transmitted through the track section 13T (see Figs. 2E and 2F) for the clearing of signal 13.

The reception of an inverse code of positive polarity at signal 7 causes the pulsing of contact 66 (see Fig. 2A) of relay 7PTR, and the pulsing of such contact causes the relay 7PH to be energized. Thus the energized condition of relay 7PH causes the signal 7 to be normally clear by the energization of the green lamp 7G of such signal upon the closing of a circuit extending from (+), including back contact 67 of relay 7NH, front contact 68 of relay 7PH, and lamp 7G, to (—).

The reception of an inverse code for the control of signal 7 in maintaining the relay 7PH energized causes the traffic direction relay 7F to be energized by an obvious circuit closed at front contact 69. Upon considering the circuits which have been described in connection with the control of the code transmitter relay 8PC, it will be noted that such relay is selected to transmit a driven code when the relay 7F is picked up, and to transmit an inverse code when the relay 7F is dropped away. It will therefore be apparent, that the shifting of the contacts of the relay 7F can be effective to change the direction of driven code transmission in the track section 8T. Such conditions will be more readily apparent hereinafter when considering the passage of a train along the trackway. It is of course, obvious that similar conditions exist at the right-hand end of siding 24 with respect to the relay 10F. Such relay is normally energized by an obvious circuit closed at front contact 174 of relay 10PH.

At the right-hand end of the siding 24, a 180+ driven code is transmitted under normal conditions by the pulsing at a 180 rate of the relay 10PC (see Fig. 2C) upon energization for each impulse of the oscillator 180CT¹ of an obvious circuit closed at front contact 70. A track circuit for track section 10T is energized in a manner similar to that described for the track circuit of track section 8T each time the relay 10PC is picked up, and the pulsing of the relay 10PTR¹ (see Fig. 2D) at the right-hand end of track section 10T is effected at a 180 rate. The pulsing of contact 71 of relay 10PTR¹ causes the relay 10PH¹ to be maintained picked up through the medium of a transformer as has been described in detail with respect to the control of the relays 8PH.

At signal 13 (see Fig. 2F), the relay 13PC¹ is pulsed at a 180 rate to cause the transmission of a 180+ driven code through the track section 13T, such pulsing being effective dependent upon the closed condition of front contact 72 of relay 14PH in a manner similar to that described with reference to the control of the code transmitter relay 7PC for the left-hand end of the siding 24.

Upon the reception of a 180+ code at the left-hand end of track section 13T, the relay 13PTR (see Fig. 2E) is active, and the pulsing of contact 73 of such relay causes the relay 13PH to be picked up in a manner similar to that described for the picking up of the relay 8PH.

The traffic direction relay 13F is normally picked up by the energization of a circuit extending from (+), including back contact 74 of relay 11SP, back contact 75 of relay 11S, back contact 76 of relay 11C, front contact 77 of relay 13PH, back contact 78 of relay 13NH, and winding of relay 13F, to (—). In accordance with the energized condition of relay 13F, the relay 11PC is operable to repeat each driven code impulse received at the left-hand end of track section 13T. Thus, relay 11PC is picked up each time the front contact 73 of relay 13PTR is closed, by the energization of a circuit extending from (+), including front contact 73 of relay 13PTR, front contact 79 of relay 13PH, front contact 80 of relay 13F, back contact 81 of relay 12S, winding of relay 11PC, and front contact 82 of relay 13F, to (—). It will be noted here, as it was in considering the control of the relay 7F at the left-hand end of the siding 24, that the transmission of a driven code through the track section 11—12T from right to left is dependent upon the energized condition of the relay 13F. If such relay is dropped away, the relays 11PC and 11NC can only transmit inverse codes.

The reception of the 180+ code at the left-hand end of track section 11—12T causes the pulsing of contact 83 (see Fig. 2D) of relay 12PTR at a 180 rate, and the pulsing of such contact causes the relays 12PH and 12D to be picked up by the energization of circuits provided similar to those illustrated in Fig. 3 for the relays 8PH and 8D. With the relays 12PH and 12D picked up, the signal 12 displays a clear indication because of the energization of a circuit closed for the green lamp 12G of such signal extending from (+), including back contact 84 of relay 12NH, front contact 85 of relay 12PH, front contact 86 of relay 12D, and lamp 12G, to (—).

Inasmuch as the relay 10PH¹ is picked up under normal conditions, the relay 12PC is normally connected to the secondary winding of the transformer for track section 11—12T which is energized in accordance with the reception of the 180+ driven code. The relay 12PC is therefore picked up during each "off" period of the driven code received, by the energization of a circuit closed from the terminal designated as (12PTFX) of the secondary winding of the transformer, including front contact 87 of relay 12PH, back contact 88 of relay 10NH¹, front contact 89 of relay 10PH¹, back contact 90 of relay 10F¹, back contact 91 of relay 11S¹, winding of relay 12PC, back contact 92 of relay 10F¹, and back contact 102 of relay 11S¹, to the opposite terminal of the secondary winding of the transformer designated as (12TFCX).

The pulsing of the relay 12PC for the transmission of an inverse code through the track section 11—12T causes the relay 11PTR (see Fig. 2E) to be active to pulse the contact 93 so as to cause relays 11PH and 11D to be energized by circuits provided similar to the circuits shown in Fig. 3 for the relays 8PH and 8D respectively. The signal 11 is therefore normally clear in accordance with the energization of the green lamp 11G by a circuit extending from (+), including back contact 96 of relay 11NH, front contact 97 of relay 11PH, front contact 98 of relay 11D, and the green lamp 11G of signal 11, to (—).

With the relay 11PH picked up, under normal conditions, the relay 13PC is active to transmit an inverse code of positive polarity through the track section 13T for the clearing of signal 13. The relay 13PC is picked up during each "off" period of the driven code received at the left-hand end of track section 13T by the energization of a circuit extending from the secondary winding terminal of the decoding transformer designated as (13PTFX), including front contact 94 of relay 13PH, front contact 95 of relay 11PH, and winding of relay 13PC, to the opposite terminal (13TFCX) of the transformer secondary winding.

At the right-hand end of track section 13T, the relay 13PTR¹ (see Fig. 2F) is active to pulse the contact 99 so as to cause the relay 13PH¹ to be maintained picked up by the energization of circuits similar to those shown in Fig. 3 for the control of relay 8PH. The picked up condition of relay 13PH¹ causes the signal 13 to display a clear indication by the energization of a circuit for the green lamp 13G of such signal extending from (+), including back contact 100 of relay 13NH¹, front contact 101 of relay 13PH¹, and lamp 13G, to (—).

The transmission of a 180+ driven code through the track section 14T is effected by the pulsing of relay 14PC in a manner similar to that which has been described with reference to the application of a 180+ driven code to the track section 8T by the code transmitter relay 8PC (see Fig. 2A).

*Passage of an east bound train.*—In considering the passage of trains through the track layout, reference will be made particularly to the manner in which such trains affect the track sections having circuits shown in Figs. 2A to 2F inclusive, and it is to be understood that the circuits thus affected are similar to those provided but not shown for the track sections and signals in similar relationship to passing sidings illustrated in Figs. 1A to 1J inclusive. Therefore, it is believed expedient to first consider the condition under which code transmission is changed for the control of signal 7 upon the approach of an east bound train. Such condition is illustrated in Fig. 1B in which the train A occupying the track sections within the limits of siding 23 causes the inverse code transmitted through the track section 7T for the control of signal 7 to be changed from positive to negative polarity so as to cause the signal 7 to display a caution indication. The manner in which the codes are transmitted through the stretch of track between sidings 23 and 24 is to be understood as being similar to the manner of code transmission through the stretch of track between sidings 24 and 25 under conditions in which the train A is within the limits of the siding 24. Such condition will be hereinafter described as the train A is assumed to progress along the trackway from left to right.

To consider the condition illustrated in Fig. 1B, the reception of an inverse code of negative polarity at the right-hand end of track section 7T causes the pulsing of the relay 7NTR (see Fig. 2A) rather than the relay 7PTR. When the relay 7PTR becomes inactive, the relay 7PH is dropped away because of the inactivity of contact 66 of relay 7PTR, and the dropping away of such relay causes the green lamp 7G of signal 7 to be extinguished by opening front contact 68.

The pulsing of contact 110 of relay 7NTR causes the relay 7NH to be picked up by the energization of circuits similar to those shown in Fig. 3 for the control of relay 8NH. The picking up of relay 7NH causes the yellow lamp 7Y of signal 7 to be illuminated for a caution indication in accordance with the energization of an obvious circuit closed at front contact 67.

The relay 7F is maintained picked up by a new circuit closed when relay 7NH is picked up and 7PH is dropped away, extending from (+), including back contact 69 of relay 7PH, front contact 111 of relay 7NH, and winding of relay 7F, to (—). The change in the polarity of the inverse code transmitted through the track section 7T under the traffic conditions being considered does not disturb the normal conditions for the other track circuits illustrated in Figs. 2A to 2F inclusive.

When the east bound train A passes the leaving signal 4 and enters the track section 4T (see Fig. 1C), the inverse code transmitted through the track sections 5—6T and 7T is removed, and therefore the signal 7 is put to stop. The removal of the inverse code of course causes the relay 7NH (see Fig. 2A) to be dropped away, and the dropping away of such relay causes the extinguishing of the yellow lamp 7Y by opening its circuit at front contact 67. A circuit is then closed for the red lamp 7R of signal 7 extending from (+), including back contact 67 of relay 7NH, back contact 68 of relay 7PH, and lamp 7R, to (—).

Upon the dropping away of the relay 7NH, the relay 7F is dropped away because its circuit is open at front contact 111, and the dropping away of that relay opens the circuit, which has been described when considering the normal conditions of the system, for the relay 8PC at front contacts 34 and 35. The relay 8PC therefore becomes inactive and removes the driven code normally transmitted through the track section 8T from the left-hand end of such track section. When such code is removed, the relay 8PH¹ (see Fig. 2B) is dropped away by contact 44 of relay 8PTR¹ becoming inactive, and the dropping away of relay 8PH¹ causes the relay 9F to be picked up to initiate the transmission of a driven code through the track section 8T from right to left.

Relay 9F is picked up under such conditions by the energization of a circuit extending from (+), including front contact 112 of relay 9PH, winding of relay 9F, back contact 113 of relay 8F, and back contact 114 of relay 8PH¹, to (—). When relay 9F is picked up, the circuit by which the relay 8PC¹ is normally active for the transmission of an inverse code is opened at contacts 47 and 48, and a circuit is closed whereby relay 8PC¹ is operable to repeat the impulses received by the relay 9PTR at the left-hand end of track section 9T. Such circuit extends from (+), including front contact 61 of relay 9PTR, front contact 115 of relay 9PH, front contact 47 of relay 9F, winding of relay 8PC¹, and front contact 48 of relay 9F, to (—). Inasmuch as the relay 9PTR is normally pulsing at a 180 rate, a 180+ code will be transmitted by the relay 8PC¹ through the track section 8T to maintain the relays 8PH and 8D (see Fig. 2A) picked up and maintain the signal 8 conditioned to be clear.

At the left-hand end of track section 8T the relay 8NC becomes active to transmit an inverse code of negative polarity in accordance with the deenergized condition of the relays 7PH and 7NH for the track section 7T, and in accordance with the deenergized condition of relay 7F. The relay 8NC is therefore connected across the decoding transformer energized upon reception of (+) impulses at the left-hand end of track section 8T so as to be energized during each "off" period of the driven code received by a circuit extending from a terminal of the secondary winding of the decoding transformer designated as (8PTFX), including front contact 116 of relay 8PH, back contact 117 of relay 7PH, back contact 118 of relay 7NH, back contact 119 of relay 7F, winding of relay 8NC, and back contact 35 of relay 7F, to the opposite terminal of the secondary winding of the decoding transformer designated as (8TFCX). The closing of front contacts 38 and 42 for the transmission of each impulse of the inverse code applies negative polarity to the track circuit for track section 8T in an obvious manner, the negative terminal of track battery 36 being connected through front contact 38 to the lower rail of the track section, and the positive terminal of track battery being connected through front contact 42 to the upper rail of track section 8T.

The shifting of the polarity of the impulses transmitted from left to right through the track section 8T causes the relay 8PH¹ (see Fig. 2B) at the right-hand end of track section 8T to be dropped away, and the relay 8NH¹ to be picked up because of the pulsing of contact 120 of relay 8NTR¹. The picking up of relay 8NH¹ causes the polarity of the inverse code transmitted through the track section 9T to be changed from positive to negative. To effect such change, the relay 9PC at the left-hand end of track section 9T becomes inactive because of the opening of its normally energized circuit at front contact 121. The relay 9NC becomes active to transmit an inverse code of negative polarity upon the picking up of relay 8NH¹ by the energization during each "off" period of the driven code received at the left-hand end of track section 9T of a circuit extending from the terminal (9PTFX) of the secondary winding of the decoding transformer including front contact 122 of relay 9PH, front contact 123 of relay 8NH¹, back contact 124 of relay 8F, winding of relay 9NC, and back contact 125 of relay 8F, to the opposite terminal (9TFCX) of the secondary winding of the decoding transformer.

The shifting of the polarity of the inverse code transmitted through the track section 9T causes the relay 9PH¹ (see Fig. 2C) to be dropped away when the contact 64 of relay 9PTR¹ becomes inactive. The relay 9NH¹ is picked up due to the pulsing of contact 126 of relay 9NTR¹. Inasmuch as the relay 10F is in its normally energized position, a stick circuit is closed for such relay to maintain the direction of code transmission established through the track section 9T. Such stick circuit extends from (+), including front contact 127 of relay 9NH¹, front contact 128 of relay 10F, and winding of relay 10F, to (—). The picking up of the relay 9NHP is dependent upon the relay 10F being in its deenergized position, so therefore such relay remains dropped away and the red lamp 9R of signal 9 is conditioned to be energized dependent upon approach control. Thus, if the relay 9ARP for approach control were picked up, the lamp 9R of signal 9 would be illuminated in accordance with the dropping away of the relay 9PH¹ by a circuit extending from (+), including front contact 129 of relay 9ARP, back contact 130 of relay 9NHP, back contact 131 of relay 9PH¹, and lamp 9R, to (—).

With the signal 9 at danger, the signal 11 in the rear thereof must be put to caution, so the driven code transmitted from left to right through the track section 10T is changed from 180+ to 75+. Such change is effected by the opening of the normally energized circuit for relay 10PC at front contact 70 of relay 9PH¹, and the closing of a circuit during each impulse of the oscillator 75CT¹ extending from contact 132 of oscillator 75CT¹, back contact 133 of relay 9S, back contact 134 of relay 9PH¹, front contact 135 of relay 9NH¹, back contact 70 of relay 9PH¹', and winding of relay 10PC, to (—).

The reception of a 75+ code at the right-hand end of track section 10T does not affect the code transmitted through the track section 11—12T for the control of signal 11 unless a train is approaching signal 11 so as to cause a reversal in the direction of driven code transmission through the track section 11—12T. That is, were a west bound train approaching signal 11 at the time the 75+ code were received at the right-hand end of track section 10T, such 75 code would be repeated into track section 11—12T so as to cause the signal 11 to display a caution indication. Under such conditions, the relay 10F¹ (see Fig. 2D) would be picked up because of the presence of the west bound train in approach of signal 11 in a manner which will be hereinafter considered, and the picked up condition of such relay would condition the relay 12PC so that such relay would transmit a (+) impulse in the track section 11—12T for each impulse received of the 75 code at the right-hand end of track section 10T. The relay 12PC would be energized each time the front contact 71 of relay 10PTR¹ is closed by a circuit extending from (+), including front contact 71 of relay 10PTR¹, front contact 136 of relay 10PH¹, front contact 90 of relay 10F¹, back contact 91 of relay 11S¹, winding of relay 12PC, and front contact 92 of relay 10F¹, to (—).

Upon the reception of the 75+ code at the right-hand end of track section 11—12T for the control of signal 11, the relay 11PTR (see Fig. 2E) would of course be maintained picked up, but the relay 11D would be dropped away because of the 75 code rate received, and upon the dropping away of that relay the lamp 11G of signal 11 would be extinguished by the opening of front contact 98, and the yellow lamp 11Y of such signal would be illuminated by the energization of a circuit extending from (+), including back contact 96 of relay 11NH, front contact 97 of relay 11PH, back contact 98 of relay 11D, and lamp 11Y, to (—).

If a traffic condition is considered in which it is assumed that the trackway is unoccupied for considerable distance in advance of the train A when it occupies track section 4T, the reception of the 75+ code at the right-hand end of track section 10T will not disturb the normal conditions of the system existent for the track sections 11—12T and 13T.

If, when the train A occupies track section 4T, an opposing train B is occupying track section 19T as illustrated in Fig. 1C, it will be noted that the signal 11 displays a caution indication because the normal conditions of the system have been changed by the transmission of the 75+ code through the track section 11—12T for the control of signal 12, dependent upon the approach of the west bound train B. It will be noted that the signal 13 under such conditions remains clear, as such signal is always clear when an inverse code of positive polarity is being received for the control of that signal, irrespective of the rate of such code. The signal 13 can be put to caution only by the transmission of a negative inverse code for the control of that signal. Such condition will be apparent from circuits which have been described for the control of signal 13 in which the green lamp 13G is illuminated whenever the relay 13PH¹ is picked up, such relay being picked up whenever a code having a positive polarity is received at the right-hand end of the track section 13T.

To consider further progress of a west bound train along the trackway, with reference to Figs. 1D and 1E, it will be noted that the presence of the train A in either track section 5—6T or track section 7T does not disturb the conditions of code transmission through the track sections 8T, 9T, 10T, 11—12T and 13T as they have been considered.

*East bound train enters siding section.*—Passage of the train A into the siding section 8T removes the inverse code which has been transmitted through the track sections 8T and 9T, and the removal of such code changes the polarity of the 75 code transmitted through the track section 10T from a (+) code to a (—) code. It will be noted that such conditions are illustrated in Fig. 1F, and it will also be noted that a similar condition with respect to another portion of the trackway is illustrated in Fig. 1B in which the approach of an opposing train is not involved. However, upon comparing Figs. 1B and 1F, it will be noted that the conditions which exist for code transmission in advance of train A for the control of opposing signals in Fig. 1B are similar to the conditions which exist for code transmission as illustrated in Fig. 1F, except for the presence of the opposing train B. The manner in which the train B affects code transmission will be hereinafter considered.

Assuming the train A to have entered the track section 8T, the relay 8NH¹ is dropped away because of the presence of the train in such track section, and the dropping away of that relay opens a circuit which has been described for the relay 9NC at front contact 123 (see Fig. 2B) to cause such relay to become inactive for the transmission of an inverse code through the track section 9T.

The removal of the inverse code from the track section 9T causes the relay 9NH¹ to be dropped away, and therefore the circuit which has been described for the code transmitter relay 10PC is opened at front contact 135 to cause such relay to become inactive for the transmission of codes through the track section 10T. The closing of back contact 135 of relay 9NH¹, however, closes a circuit to render the relay 10NC active for the transmission of a 75— code through the track section 10T in accordance with the energization during each impulse of the oscillator 75CT¹ of a circuit closed from (+), including contact 132 of oscillator 75CT¹, back contact 133 of relay 9S, back contact 134 of relay 9PH¹, back contact 135 of relay 9NH¹, back contact 137 of relay 9NHP, and winding of relay 10NC, to (—). The change in the polarity of the 75 code transmitted through the track section 10T causes the relay 10PH¹ (see Fig. 2D) to be dropped away, and the relay 10NH¹ to be picked up because of the pulsing of contact 138 of the relay 10NTR¹.

The dropping away of the relay 10PH¹ at the right-hand end of track section 10T causes the relay 12PC to become inactive for the transmission of a code through the track section 11—12T by opening the circuit for such relay at front contact 89, and the picking up of relay 10NH¹ closes a circuit for connecting the relay 12NC to the secondary winding of the decoding transformer for the left-hand end of track section 11—12T so as to cause the transmission of an inverse code of negative polarity through the track section 11—12T. The relay 12NC is energized from the secondary winding of such transformer by a circuit extending from the terminal of the secondary winding of such transformer designated as (12PTFX) including front contact 87 of relay 12PH, front contact 88 of relay 10NH¹, back contact 139 of relay 10F¹, winding of relay 12NC, back contact 92 of relay 10F¹, and back contact 102 of relay 11S¹, to the opposite terminal of the secondary winding of the transformer designated as (12TFCX). Such circuit is the one employed if there is no opposing train such as the train B as illustrated in Fig. 1F. If such train is present as illustrated in Fig. 1F, a 75—code will be received at the left-hand end of track section 11—12T, and the relay 12NH will be picked up in accordance with the polarity of the code received rather than the relay 12PH which is normally energized, and such relay in its picked up position will cause the secondary winding of the decoding transformer which is energized upon reception of negative codes to apply energy to the circuit for relay 12NC at front contact 140 of relay 12NH. It will be noted from the description of the circuit for relay 12NC that the contacts 140 and 87 merely serve to select the connection of the relay 12NC to the particular decoding transformer that is being energized in accordance with the polarity of the code received in the track section 11—12T. That is, the secondary winding of a transformer energized upon the reception of a negative code is connected to the circuit for relay 12NC if relay 12NH is picked up, and the decoding transformer energized responsive to the reception of a positive code has its secondary winding connected to the relay 12NC if relay 12PH is picked up. Such condition can be considered as typical for the selection of energy for causing inverse code transmission through the other track sections.

In accordance with the changing of the polarity of the inverse code transmitted through the track section 11—12T from a positive to a negative polarity, the relay 11PH (see Fig. 2E) is dropped away at the right-hand end of track section 11—12T, and the relay 11NH is picked up. This change, however, does not affect the yellow indication displayed by signal 11 (assuming traffic conditions as in Fig. 1F) because the yellow lamp 11Y is maintained energized with the relay 11NH picked up, by a circuit extending from (+), including front contact 96 of relay 11NH, back contact 98 of relay 11D, and lamp 11Y, to (—).

The change in polarity of the inverse code transmitted through track section 11—12T causes a change in the polarity of the inverse code transmitted through the track section 13T by rendering the code transmitter relay 13PC inactive, and by rendering the code transmitter relay 13NC active for the transmission of an inverse code for the control of signal 13. The relay 13PC becomes inactive upon the opening of front contact 95 of relay 11PH, and the relay 13NC becomes active for the transmission of an inverse code of negative polarity by the energization of a circuit including the secondary winding of whichever transformer is energized in accordance with the reception of a code at the left-hand end of track section 13T. If a positive code is being received at the left-hand end of track section 13T (assuming the west bound train B to be present), the relay 13NC is active in accordance with its connection to the secondary winding of a decoding transformer by a circuit extending from one terminal of such secondary winding designated as (13PTFX) including front contact 94 of relay 13PH, back contact 95 of relay 11PH, front contact 141 of relay 11NH, and winding of relay 13NC to the opposite terminal of the secondary winding designated as (13TFCX). If the code being received at the left-hand end of track section 13T is of negative polarity (assuming traffic condition as in Fig. 1F), the relay 13PH will be dropped away, and the relay 13NH picked up to select by closing front contact 142 the secondary winding of the decoding transformer energized upon reception of negative codes for connection to the circuit for relay 13NC.

When the inverse code transmitted through the track section 13T is changed from positive to negative polarity, the relay 13PH¹ (see Fig. 2F) at the right-hand end of track section 13T is dropped away because the contact 99 of relay 13PTR¹ becomes inactive, and the relay 13NH¹ becomes picked up because of the pulsing of contact 143 of relay 13NTR¹. Upon the dropping away of relay 13PH¹ the green lamp 13G of signal 13 is extinguished by the opening of front contact 101, and upon the picking up of relay 13NH¹ the yellow lamp 13Y is illuminated by the energization of an obvious circuit closed at front contact 100. It will be noted from the circuits which have been described for the transmission of an inverse code through the track section 13T for the control of signal 13, that the reversal of polarity of the inverse code will be effected under the traffic conditions which are under consideration irrespective of the presence of an opposing train such as the train B illustrated in Fig. 1F. In other words, with reference to Fig. 1B, it will be noted that the inverse code transmitted through the track section 7T (which compares to the track section 13T) has its polarity changed to cause the signal 7 to display a caution indication, even though the opposing train B is of such a distance away as to not affect the transmission of codes through the track section 7T.

When a train is sufficiently in approach of the entering signal 8 to have caused the opposing signal 7 to be put to stop as in Fig. 1C, the relay 8C (see Fig. 2A) associated with the stick relay 8S for signal 8 is picked up. Under such conditions the relay 8C is picked up by the energization of a circuit extending from (+), including back contact 150 of relay 7S, back contact 151 of relay 7C, back contact 152 of relay 7PH, back contact 153 of relay 7NH, back contact 154 of relay 7NHP, back contact 155 of relay 8NH, front contact 156 of relay 8PH, and winding of relay 8C, to (—). It will be noted from the circuit just described that the relay 8C is maintained energized until the relay 8PH is dropped away upon passage of the east bound train past signal 8 to open front contact 156. The relay 8C is sufficiently slow in dropping away, however, to provide a pick-up circuit for the stick relay 8S which is momentarily closed upon the dropping away of relay 8PH when the front contacts of relay 8C are still closed. Thus, upon accepting signal 8 the stick relay 8S is picked up by the energization of a circuit extending from (+), including normally closed contact 157 of the switch circuit controller for the track switch at the left-hand end of siding 24, back contact 158 of relay 7NHP, back contact 159 of relay 8NH, back contact 160 of relay 8PH, front contact 161 of relay 8C, and winding of relay 8S, to (—). The picking up of that relay closes a stick circuit at front contact 162 to shunt contact 161 out of the pick-up circuit just described.

In accordance with the picking up of the stick relay 8S, after the track section 7T has become unoccupied in the rear of the train as illustrated in Fig. 1F, a 75+ driven code is transmitted through the track section 7T for the control of signal 6. Such 75 code is applied by the code transmitter relay 7PC which is energized for each impulse formed by the oscillator 75CT by a circuit closed from (+), including contact 163 of coder 75CT, front contact 164 of relay 8S, back contact 165 of relay 8PH, and winding of relay 7PC, to (−).

The manner in which the 75+ code is repeated through the track section 5—6T for the control of signal 6 will be readily recognized as comparable to a similar condition to be considered with respect to the repeating of a 75+ code through the track section 11—12T for the caution indication of signal 12.

If the trackway in the rear of the train A is unoccupied as illustrated in Fig. 1F, the transmission of a 75+ code through the track section 7T provides a carrier for an inverse code to be transmitted for the control of signal 7 to cause such signal to be restored to its normally clear condition. As the train A proceeds further along the trackway so as to leave the track section 8T unoccupied, the relay 8PH¹ (see Fig. 2B) becomes picked up upon the reception of a 180+ driven code which is transmitted by the relay 1PC in accordance with the energization of circuits which have been described when considering normal conditions of the system. That is, the relay 8PC is active in accordance with the picked up condition of the relay 7PH which is picked up upon the reception of an inverse code of positive polarity for the control of signal 7. The picking up of such relay of course causes the picking up of the relay 7F which in turn closes a circuit which has been described for the relay 8PC at front contacts 34 and 35 to cause relay 8PC to be active for the transmission of a driven code. With the track section 9T occupied by the train, however, the relays 8PC¹ and 8NC¹ are both inactive for the transmission of an inverse code back through the track section 8T because of their circuits being opened by the de-energized condition of the relays 9PH and 9NH respectively.

*APB tumble-down.*—To consider further progress of the east bound train, assume that the train accepts the normally clear signal 10 and enters the track section 10T. It will be noted with reference to Fig. 1C, that a similar condition is illustrated with respect to the entrance of a train A into the stretch of track extending between passing sidings 23 and 24. The entrance of the train A into the track section 10T causes the relay 10NH¹ (see Fig. 2D) to be dropped away at the right-hand end of track section 10T, and the dropping away of that relay opens the circuit which has been described for the code transmitter relay 12NC at front contact 88 to cause such relay to be rendered inactive for the transmission of an inverse code.

Therefore, at the right-hand end of track section 11—12T, the relay 11NH (see Fig. 2E) is dropped away in accordance with the removal of the inverse code through the track section 11—12T, and the dropping away of such relay opens the circuit which has been described for the yellow lamp 11Y of signal 11 and closes an obvious circuit at back contact 96 for the energization of the red lamp 11R for such signal. When the relay 11NH is dropped away, the circuit by which relay 13NC has been active for the transmission of an inverse code is opened at front contact 141 to remove the inverse code from the track section 13T. As a result of the removal of such code from the track section 13T, the relay 13NH¹ (see Fig. 2F) is dropped away, and the dropping away of such relay opens the circuit for the yellow lamp 13Y of signal 13 at front contact 100, and closes a circuit for the red lamp 13R of signal 13 extending from (+), including back contact 100 of relay 13NH¹, back contact 101 of relay 13PH¹, and lamp 13R, to (−).

When the relay 13NH¹ is dropped away, the circuit normally closed by which the relay 14PC is active for the transmission of a driven code is opened at front contact 166 to cause such relay to become inactive. The relay 14PC is normally active in accordance with the energization of a circuit similar to the circuit described in detail for the relay 8PC at the left-hand end of the track section 8T. Upon the removal of the driven code from the track section 14T, the transmitter at the right-hand end of the track section 14T becomes active to transmit a 180 driven code to the left-hand end of track section 14T for the control of signal 14 in a manner similar to that described with reference to the transmission of a driven code through the track section 8T for the control of signal 8.

In a manner similar to that described in connection with the passage of a train past the signal 8, the relay 10S is picked up upon passage of the east bound train past the signal 10. When the train is in approach of the signal 10, the relay 10C is picked up by the energization of a circuit extending from (+), including back contact 167 of relay 9S, back contact 168 of relay 9C, back contact 169 of relay 9PH¹, back contact 170 of relay 9NH¹, back contact 171 of relay 9NHP, back contact 172 of relay 10NH, front contact 173 of relay 10PH, and winding of relay 10C, to (−). It will be noted that the relay 10C would be picked up in accordance with the closing of front contact 172 of relay 10NH if a code of negative polarity were being transmitted through the track section 10T as would be the case under the traffic conditions as illustrated in Fig. 1F.

When the east bound train has accepted signal 10, the relay 10PH is dropped away to open the circuit which has been described for relay 10C at front contact 173, but the relay 10C, because of its slow action, is maintained picked up long enough to cause the picking up of the relay 10S by the energization of a circuit extending from (+), including back contact 174 of relay 10PH, back contact 175 of relay 10NH, front contact 176 of relay 10C, and winding of relay 10S, to (−). The picking up of such relay closes a stick circuit at front contact 177 to shunt contact 176 out of the circuit which has just been described. It will be noted of course that the dropping away of the relay 10PH when the east bound train passes signal 10 causes the extinguishing of the green lamp 10G of signal 10 by the opening of front contact 178, and causes the red lamp 10R of such signal to become illuminated.

*Passage of east bound train through stretch between sidings.*—When the track section 9T has become unoccupied in the rear of the east bound train, the relay 9PC¹ becomes active to transmit a 75+ code through the track section for the control of signal 8 in accordance with the picked up condition of the stick relay 10S. The relay 9PC¹ is picked up during each impulse produced by the oscillator 75CT¹ upon the closing of a circuit extending from (+), including contact 179 of oscillator 75CT¹, front contact 180 of relay 10S, back contact 181 of relay 10PH, back contact 182 of relay 10NH, front contact 183 of relay 10F, winding of relay 9PC¹, and front contact 184 of relay 10F, to (—). It will be noted that the relay 10F is picked up under such conditions because of the closure of front contact 185 of the stick relay 10S.

It will be noted from the description as it has been set forth up to this point that a 180+ driven code has been applied to the track section 8T at the left-hand end thereof, and that a 75+ driven code has been applied to the track section 9T at the right-hand end thereof. The reception of the 180+ code at the right-hand end of track section 8T causes the transmission of an inverse code of positive polarity, as has been described under normal conditions, through the track section 9T for the control of signal 9; and in a similar manner, the picked up condition of the relay 9PH (see Fig. 2B) in accordance with the reception of the 75+ code at the left-hand end of track section 9T causes the transmission of an inverse code of positive polarity for the control of signal 8. Thus, it will be noted that the conditions are restored to normal for the track sections within the siding limits except for the 75+ driven code transmitted through the track section 9T. Therefore, were a following east bound train to approach the signal 8, the 180+ code transmitter at the left-hand end of the track section 8T would become inactive, and the 75+ code received at the left-hand end of track section 9T would be repeated through the track section 8T to cause the signal 8 to be put to caution, such repeating through being in a manner similar to that which has been described for the repeating through of a 180 code upon considering the approach to signal 8 of an east bound train when the track sections in advance thereof are assumed to be unoccupied.

If the east bound train is occupying track section 10T in approach of signal 12 and the trackway is unoccupied in advance of the signal, the signal 12 is clear in accordance with the reception of a 180 driven code in a manner which has been described when considering the normal conditions of the system. The presence of the east bound train in track section 10T causes the picking up of the relay 12C (see Fig. 2D) so as to condition the stick relay 12S so that it can be picked up when the train accepts the signal 12. Relay 12C is picked up under such conditions by the energization of a circuit extending from (+), including back contact 190 of relay 11S¹, back contact 191 of relay 11C¹, back contact 192 of relay 10PH¹, back contact 193 of relay 10NH¹, back contact 194 of relay 12NH, front contact 195 of relay 12PH, and winding of relay 12C, to (—).

When the east bound train accepts the signal 12, the shunting of the track section 11—12T causes the dropping away of relays 12D and 12PH, and the dropping away of such relays extinguishes the green lamp 12G of signal 12 and causes the illumination of the red lamp 12R upon the shifting of contacts 86 and 85 respectively. The dropping away of relay 12PH also closes a circuit to cause the picking up of the stick relay 12S which is similar to a circuit which has been heretofore described for the picking up of the relay 10S. The relay 12C is of course dropped away upon the opening of front contact 195 of relay 12PH.

When the track section 10T becomes unoccupied in the rear of the train, the normal conditions of the system become effective in that the relay 10PH¹ (see Fig. 2D) is picked up upon the reception of a 180+ driven code transmitted from the left-hand end of track section 10T by the code transmitter relay 10PC. The relays 10PC¹ and 10NC¹ at the right-hand end of track section 10T are ineffective to transmit an inverse code, however, because the relays 12NH, 12PH and 12SP are dropped away at that time on account of the presence of the train in the track section 11—12T. Therefore, when the track section 11—12T is occupied by the east bound train, the leaving signal 10 is maintained at stop because there is no code transmitted for its control. This is in accordance with the overlap control for signal 10 as diagrammatically shown in Fig. 1A which extends the control of signal 10 to the location of the opposing signal 11.

The presence of the east bound train in track section 11—12T causes the picking up of the relay 12C¹ (see Fig. 2E) by the energization of a circuit similar to that which has been described in connection with the picking up of the relay 12C, and the passage of the train into the track section 13T causes the picking up of the relay 12S¹ in a manner similar to that which has been described in connection with the picking up of the stick relay 10S. The entrance of the train into the track section 13T of course causes the dropping away of the relay 13PH upon the shunting of the track section 13T. The picking up of the stick relay 12S¹ opens the circuit by which relay 11PC has been active at back contact 81, and closes a circuit by which relay 11PC is steadily energized, extending from (+), including front contact 81 of relay 12S¹, winding of relay 11PC, and front contact 82 of relay 13F, to (—).

The steady energization of the transmitter relay 11PC of course causes the steady energization of the track circuit of track section 11—12T. When such track is unoccupied in the rear of the east bound train, the relay 12SP (see Fig. 2D) at the left-hand end of track section 11—12T becomes picked up, due to the steady energization of the track circuit, by the energization of a circuit extending from (+), including front contact 83 of relay 12PTR, front contact 197 of relay 128, and winding of relay 12SP, to (—). When the relay 12SP is picked up, a circuit is closed to cause the relay 10NC¹ to transmit an inverse code of negative polarity through the track section 10T for the caution indication of signal 10. Such circuit extends from the secondary winding terminal of the transformer used in decoding the driven code received through the track section 10T, designated as (10PTFX), including front contact 198 of relay 10PH¹, back contact 199 of relay 12PH, front contact 200 of relay 12SP, back contact 201 of relay 12NH, and winding of relay 10NC¹, to the opposite terminal of the transformer winding designated as (10TFCX).

At the left-hand end of track section 10T, the reception of an inverse code of negative polarity causes the picking up of relay 10NH (see Fig. 2C, and the picking up of that relay closes an obvious circuit at front contact 202 for the yellow lamp 10Y of signal 10, the red lamp 10R being extinguished by the opening of back contact 202. The picking up of the relay 10NH also causes the dropping away of the stick relay 10S by opening the circuit for such relay at back contacts 175. The dropping away of relay 10S causes the restoration to normal of the transmission of the 180+ driven code through the track section 9T in accordance with the shifting of contact 182 of relay 10NH.

It is believed that it will be readily apparent that the codes transmitted through the track sections in advance of signal 14 for the control of opposing signals upon the approach of signal 14 by the east bound train A, are similar in character to the codes which have been described as being transmitted for similar traffic conditions associated with the passage of an east bound train past the siding 24. However, passage of an east bound train through the siding 25 will be considered to some extent in order that an understanding may be had as to the codes transmitted in the rear of the train for a following train, and in order that the mode of operation of the system in restoration to normal in the rear of a train may be fully described.

To consider further passage of the east bound train, assume the train to have entered the track section 14T and assume the track section 13T to have become unoccupied in the rear of the train. Under such conditions, the relay 13PC$^1$ (see Fig. 2F) is active to transmit a 75+ code through the track section 13T in accordance with the closing of a circuit for each impulse of the oscillator 75CT$^2$ extending from (+), including contact 203 of coder oscillator 75CT$^2$, front contact 204 of relay 14S, back contact 72 of relay 14PH, and winding of relay 13PC$^1$, to (—).

At the left-hand end of track section 13T, the relay 13PH (see Fig. 2E) is picked up by the pulsing of contact 73 of relay 13PTR when the 75+ code is transmitted through the track section 13T, and the picking up of such relay causes the dropping away of the stick relay 12S$^1$ by opening the circuit for such relay at back contact 209. The picking up of relay 13PH under such conditions closes a circuit at front contact 77 for relay 13F to maintain such relay picked up after the front contact 210 of relay 12S$^1$ has been opened. The dropping away of relay 12S$^1$ opens the circuit by which relay 11PH has been steadily energized at front contact 81.

The relay 11PC becomes active to repeat into track section 11—12T the 75+ code transmitted through the track section 13T. The relay 11PC is picked up each time front contact 73 of relay 13PTR is closed, by the energization of a circuit extending from (+), including front contact 73 of relay 13PTR, front contact 79 of relay 13PH, front contact 80 of relay 13F, back contact 81 of relay 12S$^1$, winding of relay 11PC, and front contact 82 of relay 13F, to (—).

The reception of a 75+ code at the left-hand end of track section 11—12T causes the picking up of relay 12PH (see Fig. 2D) by the pulsing of contact 83 of relay 12PTR. The picking up of such relay causes the extinguishing of the red lamp 12R of signal 12 by opening back contact 85, and causes the yellow lamp 12Y of such signal to be illuminated by the energization of an obvious circuit including back contact 84 of relay 12NH, front contact 85 of relay 12PH, and back contact 86 of relay 12D. The relay 12S is dropped away by the opening of its circuit at back contact 214 of relay 12PH, and the dropping away of relay 12S causes the relay 12SP which has been steadily energized to be dropped away by opening its circuit at front contact 197. The circuit which has been described for the transmission of an inverse code of negative polarity for the control of signal 10 in accordance with the picked up condition of the steadily energized relay 12SP is thus opened at front contact 200, and a circuit is closed by the picking up of relay 12PH to render the relay 10PC$^1$ active for the transmission of an inverse code of positive polarity for the control of signal 10. Relay 10PC$^1$ is active to transmit an inverse code because of the closure of a circuit extending from the terminal (10PTFX) of the secondary winding of the decoding transformer including front contact 198 of relay 10PH$^1$, front contact 199 of relay 12PH, and winding of relay 10PC$^1$, to the opposite terminal (10TFCX) of the secondary winding of the decoding transformer.

The reception of the inverse code of positive polarity at the left-hand end of track section 10T causes the relay 10PH (see Fig. 2C) to be picked up by the pulsing of contact 215, the relay 10NH to be dropped away upon the change in polarity of the code received. The dropping away of relay 10NH opens the circuit for the yellow lamp 10Y of signal 10 at front contact 202, and the closing of front contact 173 of relay 10PH closes an obvious circuit for the energization of the green lamp 10G of signal 10 for the display of a clear indication.

Inasmuch as the relay 10PH$^1$ (see Fig. 2D) is picked up (assuming the trackway in the rear of the train occupying track section 14T to be unoccupied) the relay 12PC becomes active to transmit an inverse code through the track section 11—12T when a driven code is transmitted through such track section from right to left to effect the pulsing of the relay 12PTR. The relay 12PC is active to transmit an inverse code of positive polarity under such conditions in accordance with its connection with the secondary winding of the decoding transformer by a circuit which has been described when considering the normal conditions of the system. The reception of the inverse code of positive polarity at the right-hand end of track section 11—12T of course causes the picking up of the relay 11PH (see Fig. 2E) by the pulsing of contact 93, and the relay 11PH when picked up closes a circuit which has been described under normal conditions to render the relay 13PC active to transmit an inverse code through the track section 13T for the clearing of signal 13.

From the description as it has been heretofore set forth under conditions where an east bound train is assumed to have passed the entering signal 14, it will be noted that the normal conditions of the system are restored for the stretch of single track between sidings 24 and 25, except that a 75+ code is being transmitted through the track sections 13T and 11—12T for the caution indication of signal 12. If the east bound train proceeds further along the trackway so as to cause the siding sections 14T and 15T to become unoccupied (see Fig. 1A), the signal 14 is put to caution in a manner similar to that described for similar traffic conditions in advance of signal 8, and the reception of a code of positive polarity at the left-hand end of the track section 14T causes the relay 14PH (see Fig. 2F) to be picked up so as to open the circuit by which relay 13PC$^1$ has been active for the transmission of a 75+ code at back contact 72, and close an obvious circuit by which the relay 13PC$^1$ transmits a 180+ code. The reception of the 180+ code at the left-hand end of track section 13T causes the code transmitter relay 11PC (see Fig. 2E) to repeat such code into the track section 11—12T, and the reception at signal 12 of the 180+ code causes the picking up of the relay 12D (see Fig. 2D) which is tuned to such code rate. The relay 12D when picked up opens the circuit for the yellow lamp 12Y of signal 12 at back contact 86 and closes a circuit for the green lamp 12G which has been described when considering the normal conditions of the system.

It is believed to be readily understood from the circuits which have been described for the passage of a train through a typical stretch of track including the siding sections associated with the siding 24 and the single stretch of track between sidings 24 and 25, how the circuits are provided for the various other siding sections and other stretches of single track as illustrated in Figs. 1A to 1J inclusive, and as might be encountered in practice.

*Passage of west bound trains.*—It will be apparent with reference to the diagrams of Figs. 1B to 1F inclusive, which show the codes transmitted under various traffic conditions for both directions of traffic, that similar codes are used for similar purposes for governing signals for west bound traffic as those used for governing signals for east bound traffic. It therefore should be readily apparent to those familiar with the art that the mode of operation for passage of west bound trains is similar to that which has been described in detail for east bound trains. One difference, however, in the mode of operation for west bound traffic is that the direction of driven code transmission in the center track section of a stretch of track between sidings (such as the track section 17—18T between the sidings 25 and 26) is changed when a west bound train approaches such track section. More specifically, upon comparing Figs. 1B and 1C, it will be noted that the passage of the west bound train B into the stretch of single track between sidings 25 and 26 so that such train is immediately in the approach of signal 17 causes a reversal in the direction of code transmission through the track section 17—18T so that the signal 17 is cleared in accordance with the reception of a 180+ driven code.

To consider how such reversal in direction of code transmission is effected, it will be assumed that a west bound train accepts the leaving signal 13 at a time when the trackway in advance of the train is unoccupied. This condition can be compared with the traffic condition illustrated in Fig. 1C where the train B has been assumed to have accepted the leaving signal 19.

Prior to the passage of the train past the signal 13, the normal conditions of the system exist for the direction of code transmission through the stretch of single track extending between the sidings 24 and 25. The entrance of the train into track section 13T, under the traffic conditions assumed, causes the dropping away of the code receiving relay 13PH (see Fig. 2E) at the left-hand end of track section 13T, and the dropping away of such relay causes the relay 13F to be dropped away by opening its normally energized circuit at front contact 77. The dropping away of relay 13F opens a circuit at front contacts 82 and 80 by which the relay 11PC is normally active for the transmission of a driven code from right to left through the track section 11—12T, and the removal of the driven code from such track section causes the code receiving relay 12PH (see Fig. 2D) at the left-hand end of the track section to be dropped away.

When the relay 12PH has been dropped away because of the removal of the driven code from the right-hand end of the track section 11—12T, a circuit is closed to cause the picking up of the relay 10F¹ extending from (+), including back contact 220 of relay 12SP, back contact 221 of relay 12S, back contact 222 of relay 12C, back contact 223 of relay 12PH, back contact 224 of relay 12NH, front contact 225 of relay 10PH¹, back contact 226 of relay 10NH¹, and winding of relay 10F¹, to (−). The picking up of relay 10F¹ under such conditions opens the circuit at back contacts 90 and 92 by which the relay 12PC has been active for the transmission of an inverse code, and closes a circuit to cause the relay 12PC to repeat the 180+ driven code received at the right-hand end of track section 10T. The relay 12PC therefore becomes picked up each time the front contact 71 of relay 10PTR¹ is closed by the energization of a circuit extending from (+), including front contact 71 of relay 12PTR¹, front contact 136 of relay 10PH¹, front contact 90 of relay 10F¹, back contact 91 of relay 11S¹, winding of relay 12PC, and front contact 92 of relay 10F¹, to (−).

The reception of a 180+ code at the right-hand end of track section 11—12T of course causes the relays 11D (see Fig. 2E) and 11PH to be picked up responsive to the pulsing of the contact 93 of relay 11PTR. With the relays 11PH and 11D picked up, the green lamp 11G of signal 11 is illuminated in accordance with the energization of a circuit which has been described.

It is believed to be readily apparent from the description as it has been set forth how a 75+ or a 75− code would be repeated through the track section 11—12T for the caution indication of signal 11, if there should be another train in a position requiring the signal 11 to be put to caution. For repeating the 75+ code into track section 11—12T the relay 12PC would be active by the energization of a circuit which has just been described, and for repeating the 75− code into track section 11—12T the relay 12NC would be active in accordance with the energized condition of relay 10NH¹. Relay 12NC would be picked up for each impulse under such conditions by the energization of a circuit extending from (+), including front contact 138 of relay 10NTR¹, front contact 261 of relay 10NH¹, front contact 139 of relay 10F¹, winding of relay 12NC, and front contact 92 of relay 10F¹, to (−).

When the track section 13T becomes unoccupied in the rear of the train, the relay 13PH is picked up in accordance with the restoration to normal of the code transmission in the rear of the train, but the picking up of that relay cannot cause the picking up of the relay 13F because the circuit for relay 13F is open at front contact 75 of the stick relay 11S which is picked up upon entrance of the train in track section 11—12T. This mode of operation will be recognized as similar to that which has been described under similar traffic conditions for the opposite direction of traffic.

When the west bound train proceeds further along the trackway so as to enter the track section 10T, the stick relay 11S¹ (see Fig 2D) is picked up, according to a mode of operation which has been described, and the picking up of such relay closes a circuit for relay 10F¹ at front contact 228. Such contact is connected in multiple with contact 225 of relay 10PH¹, so that the relay 10F¹ will be maintained picked up while the track section 10T is occupied.

The restoration to normal for the direction of code transmission through the track section 11—12T is not effective until the single stretch of track between the sidings 24 and 25 becomes unoccupied in the rear of the west bound train. This is true because steady energization is effective for the track section 11—12T when the west bound train occupies the track section 10T for purposes similar to those described in detail under similar traffic conditions for the passage of an east bound train.

When track section 10T becomes unoccupied in the rear of the train, the code transmitter relay 10PC (see Fig. 2C) is effective for the transmission of a 75+ driven code through the track section 10T because of its energization for each impulse of the oscillator 75CT¹ by a circuit extending from (+), including contact 132 of the oscillator 75CT¹, front contact 133 of relay 9S, back contact 70 of relay 9HP¹, and winding of relay 10PC, to (—). The reception of the 75+ code at the right-hand end of track section 10T causes the picking up of the relay 10PH¹, (see Fig. 2D), and the picking up of such relay causes the dropping away of the stick relay 11S¹ by opening its circuit at back contact 227. The dropping away of 11S¹ opens the circuit by which the relay 10F¹ has been energized at front contact 228 but the relay 10F¹ is maintained picked up by the closure of front contact 225 of the relay 10PH¹. The dropping away of relay 11S¹ opens the circuit by which the relay 12PC has been steadily energized to provide steady energization for the track section 11—12T at front contact 91, and the closing of back contact 91 of the relay 11S¹, with the relay 10F¹ picked up, closes a circuit by which the relay 12PC repeats each impulse received at the right-hand end of track section 10T. Each time the front contact 71 of relay 10PTR¹ is closed, the relay 12PC is picked up by the energization of a circuit extending from (+), including front contact 71 of the relay 10PTR¹, front contact 136 of relay 10PH¹, front contact 90 of relay 10F¹, back contact 91 of relay 11S¹, winding of relay 12PC, and front contact 92 of relay 10F¹, to (—). The pulsing of the relay 12PC causes the picking up at the right-hand end of track section 11—12T of the relay 11PH (see Fig. 2E), and the picking up of such relay causes the dropping away of the stick relay 11S by opening its circuit at back contact 229. When the relay 11S is dropped away, the circuit by which the relay 11SP has been steadily energized is opened at front contact 230, and the dropping away of the relay 11SP conditions a circuit by which the relay 13F can be picked up. The relay 13PH is of course picked up at that time in accordance with the reception of a driven code transmitted from right to left through the track section 13T, and therefore the relay 13F can be picked up by the energization of a circuit extending from (+), including back contact 74 of relay 11SP, back contact 75 of relay 11S, back contact 76 of relay 11C, front contact 77 of relay 13PH, back contact 78 of relay 13NH, and winding of relay 13F, to (—).

When relay 13F is picked up, a circuit is closed by which the relay 13PC repeats the code received at the left-hand end of track section 13T in a manner heretofore described when considering the normal conditions of the system. It will therefore be apparent that the relays 11PC and 12PC are both momentarily effective for repeating codes into the track section 11—12T, and what is commonly known as a "code fight" becomes effective. Due to a difference in the codes being repeated by the respective PC relays, or due to a slight difference in the characteristics of the oscillators forming the impulses which are repeated, the code applied by the relay 11PC at the right-hand end of track section 11—12T becomes effective to cause the picking up of the relay 12PH (see Fig. 2D) at the left-hand end of track section 11—12T. When the relay 12PH is picked up, the relay 10F¹ is dropped away by the opening of its circuit at back contact 223, and therefore the relay 12PC becomes ineffective to repeat the code received at the right-hand end of track section 10T because of the opening of the circuit for relay 12PC at front contacts 90 and 92. The closing of back contacts 90 and 92 of relay 10F¹ connects the relay 12PC across the secondary winding of the decoding transformer for the left-hand end of track section 11—12T so as to cause the relay 12PC to become effective, in a manner described when considering the normal conditions of the system, for transmitting an inverse code of positive polarity through track section 11—12T for the control of signal 11. The approach of a following train to signal 11 would of course maintain the direction of driven code transmission from left to right because under such conditions the relay 12PH would not be allowed to pick up.

Having considered in detail the manner of reversal of direction of driven code transmission in the track section 11—12T in accordance with the passage of a west bound train, and the manner of restoration to the normal direction of coding in that track section after passage of the train, it is believed that the mode of operation of the system for the passage of a west bound train can be readily understood upon considering as typical the mode of operation and circuits described in detail for the various traffic conditions associated with east bound traffic.

*Meeting of trains.*—With reference to Figs. 1G to 1J inclusive, the most common conditions to be encountered upon the meeting of trains are illustrated. In Figs. 1G and 1H, it is assumed that the west bound train B is the first to approach the passing siding 24, and in Figs. 1I and 1J, it is assumed that the east bound train A is the first to approach the passing siding 24. The first train to approach the siding, for the purpose of description of the present invention, is assumed to be the first train to have entered the stretch of single track extending from the next siding away from the siding under consideration. The train B therefore, for example, in Fig. 1G, is assumed to have accepted the entering signal 13 prior to the acceptance of the entering signal 4 by the train A, and conversely, in Fig. 1I, the train A is assumed to have accepted the entering signal 4 prior to the acceptance of the entering signal 13 by the train B.

Broadly speaking, the first train to approach a siding for a meet, establishes a direction of driven code transmission through the track sections of the siding to be used for the meet, and the subsequent approach of an opposing train is ineffective to change the direction of driven code transmission through such siding sections. This is necessarily true because, with reference to Fig. 1C, it will be noted that the passage of an east or a west bound train past the leaving signal at a siding causes the transmission through the track sections at the next siding of a driven code toward the train, if there are no opposing trains involved. When opposing trains are involved, however, obviously the direction of driven code transmission must be established through the siding sections for transmission toward one or the other of the two trains. It is therefore provided that the first train to establish the direction of driven code transmission through the siding sections associated with a passing siding which may be used for a meet, definitely establishes the direction of driven code transmission through the siding sections in such a manner that the direction cannot be reversed upon the approach to that siding of an opposing train.

It has been described that the relays F for the various ends of the track sections are effective to govern the direction of code transmission through the track sections. It is therefore provided that a relay F when conditioned by the first train to approach a siding for a meet, is maintained picked up by a stick circuit in case of the approach of an opposing train in order to prevent a possible reversal in the direction of driven code transmission from the direction which has been first established.

To consider more specifically the conditions involved, assume that the conditions of traffic and code transmission are as illustrated in Fig. 1G, the train B being the first to approach the siding 24. In accordance with the usual mode of operation upon passage of a west bound train, the relay 10F (see Fig. 2C) at the right-hand end of the siding 24 is dropped away upon the removal of the inverse code transmitted through the track section 10T for the control of signal 10 when the train B accepts the leaving signal 13. The dropping away of the relay 10F of course removes the driven code transmitted under normal conditions through the track section 9T, and the removal of such code causes the driven code being transmitted through the track section 8T to be repeated into the track section 9T. Upon the reception of such repeated code at the right-hand end of track section 9T, the code transmitter for the right-hand end of track section 9T becomes effective to transmit an inverse code from right to left through the track section 9T, and an inverse code of similar character is transmitted through the track section 8T for the control of signal 8.

The inverse code transmitted through the track sections 9T and 8T for the control of signal 8, under the assumed traffic conditions, is of negative polarity, because it is desirable under such conditions that the opposing signal 6 in the rear of the entering signal 8 be put to caution. The reception of the inverse code of negative polarity for the control of signal 8, however, cannot be effective to put such signal to caution as the relay 7NHP (see Fig. 2A) governing the caution indication of signal 8 is dropped away at that time. The relay 7NHP is dropped away because the relay 7F for selecting the direction of driven code transmission through the track section 8T is maintained picked up by a stick circuit which has been closed dependent upon the approach of the train B prior to the approach of the train A to the siding 24. More specifically, the reception of an inverse code of negative polarity at the left-hand end of track section 8T causes the relay 8NH to be picked up in accordance with the pulsing of contact 240 of relay 8NTR. With reference to Fig. 3 it will be noted that the pulsing of contact 240 of relay 8NTR is effective through the medium of the transformer 8NTF to cause the picking up of relay 8NH in a manner similar to that described for the picking up of the relay 8PH upon the pulsing of contact 51 of relay 8PTR. The contact 241 of relay 8NTR serves to rectify the alternating current induced in the secondary winding 242 of the transformer 8NTF to cause the relay 8NH to be energized by direct current.

The relay 8NH is therefore picked up upon the passage of the train B past the leaving signal 13, and the picking up of such relay closes a stick circuit for the relay 7F so as to maintain the direction of transmission of driven codes established for the track section 8T. Such stick circuit for the relay 7F extends from (+), including front contact 243 of relay 8NH, front contact 244 of relay 7F, and winding of relay 7F, to (—). The relay 7NHP cannot be picked up because its circuit is opened at back contact 244, and therefore the signal 8 is conditioned to display a danger indication, dependent upon the closure of front contact 57 of the approach relay 8ARP to provide approach lighting. The conditioning of the signal 8 to display a danger indication as soon as the train B has passed the leaving signal 13 establishes effectively an overlap control under such traffic conditions for the signal 8 extending to the next passing siding.

After the conditions have become effective as they have been described, however, the passage of the east bound train A past the leaving signal 4 is effective to change the driven code transmitted through the track sections 8T and 9T from the 180+ code, which would be transmitted under conditions similar to those illustrated in Fig. 1C for transmission through the siding 25, to a 75— code for the purpose of providing proper restrictive indications for the signals 9 and 11. The indication displayed by the signal 9, however, differs from that described for signal 8 in that the signal 9 displays a caution rather than a danger indication. This type of control is provided because it is probable that the train B will be the first to enter the siding sections, and such train should not be governed by more restrictive indications than are required in practice.

Inasmuch as the other traffic conditions which have been heretofore considered did not provide for the transmission of a 75— driven code through the track sections 8T and 9T, consideration will now be given to the circuits for providing the transmission of such code under the traffic conditions illustrated in Fig. 1G. The approach of the train A of course causes the inverse code to be removed from the track section 7T for the control of signal 7, and therefore the relays 7PH (see Fig. 2A) and 7NH are dropped away. Under such conditions, with the relay 7F maintained picked up in a manner which has been described, the relay 8NC is active to transmit a 75 code of negative polarity through the track section 8T because of its energization during each impulse of the oscillator 75CT by a circuit closed from (+), including contact 245 of oscillator 75CT, back contact 246 of relay 7S, back contact 247 of the approach repeater relay 8ARP, back contact 248 of relay 7PH, back contact 249 of relay 7NH, front contact 119 of relay 7F, winding of relay 8NC, and front contact 35 of relay 7F, to (—).

The reception of that code at the right-hand end of track section 8T of course causes the relay 8NH¹ (see Fig. 2B) to be picked up. The relay 8F is picked up because the inverse code of negative polarity transmitted from right to left through track section 9T is of negative polarity so as to cause the relay 9PH to be dropped away. Thus, the relay 8F is picked up under such conditions by the energization of a circuit extending from (+), including front contact 250 of relay 8NH¹, winding of relay 8F, back contact 251 of relay 9F, and back contact 252 of relay 9PH, to (—). When the relays 8NH¹ and 8F are picked up, the relay 9NC is active to repeat the 75— code transmitted through the track section 8T into the track section 9T by the energization each time the front contact 120 of relay 8NTR¹ is closed of a circuit extending from (+), including front contact 120 of relay 8NTR¹, front contact 253 of relay 8NH¹, front contact 124 of relay 8F, winding of relay 9NC, and front contact 125 of relay 8F, to (—).

The reception of the 75— code at the right-hand end of track section 9T causes the relay 9NH¹ (see Fig. 2C) to be picked up upon the pulsing of contact 126 of relay 9NTR¹, and the picking up of that relay closes a circuit to cause the picking up of the relay 9NHP because the relay 10F is dropped away at that time. The relay 10F is obviously dropped away at that time on account of the removal of the inverse code transmitted through the track section 10T for the control of signal 10 as has been described. The relay 9NHP is therefore picked up by the energization of a circuit extending from (+), including front contact 127 of relay 9NH¹, back contact 128 of relay 10F, and winding of relay 9NHP, to (—). The relay 9NHP when picked up conditions a circuit for the energization of the yellow lamp 9Y of signal 9 so that such lamp can be illuminated upon the picking up of the relay 9ARP for providing approaching lighting. Such circuit extends from (+), including front contact 129 of relay 9ARP, front contact 130 of relay 9NHP, back contact 254 of relay 9D, and lamp 9Y, to (—). The reception of the 75— code at the right-hand end of track section 9T causing the picking up the relay 9NH¹, is effective to provide for the transmission of a 75+ code from left to right through the track section 10T in a manner corresponding to that which has been described upon considering the traffic condition illustrated in Figs. 1C, 1D and 1E. It is believed to be readily apparent from the description as it has been set forth that the 75+ code would be repeated through to signal 11 for the caution indication of such signal if the west bound train B had not already entered the track section 11—12T as illustrated in Fig. 1G.

If the train B should accept the entering signal 9 prior to the entrance of train A into track section 7T, the signal indication provided by signal 9 for the train B would be at caution. However, if the train A should enter the track section 7T prior to the passage of signal 9 by the train B, the signal 9 would be put to danger. This is in accordance with the effective overlap control for signal 9, which, under the assumed traffic conditions, includes the track section 7T.

Therefore, with reference to Fig. 1H, it will be noted that the entrance of the train A into the track section 7T causes the signal 9 to be put to danger, by removing the 75— code which has been transmitted as illustrated in Fig. 1G for the caution indication of such signal. This is true irrespective of whether the train B has entered the track section 10T or not.

More specifically, the entrance of the train A into the track section 7T causes the picking up of the approach relay 8ARP (see Fig. 2A), such relay being a repeater of the approach relay 8AR which becomes active in accordance with the presence of the train A in the track section 7T. The relay 8AR is active because of the pulsing of the relay 7PC which is pulsed by energization during each impulse of the code oscillator 75CT. The relay 7PC is energized for each impulse by a circuit closed from (+), including contact 163 of oscillator 75CT, back contact 164 of relay 8S, back contact 245 of relay 8PH, front contact 246 of relay 8NH, back contact 165 of relay 8PH, and winding of relay 7PC, to (—).

The approach relay 8AR therefore becomes active when the track section 7T is occupied by the train A upon the energization of a circuit closed from the positive terminal of track battery 255 including the winding of relay 8AR, front contact 256 of relay 7PC, back contact 257 of relay 7NC, lower rail of track section 7T, shunt caused by the train A, upper rail of track section 7T, back contact 258 of relay 7NC, and front contact 259 of relay 7PC, to the negative terminal of track battery 255. The pulsing contact 260 of the relay 8AR causes the approach repeater relay 8ARP to be picked up in an obvious manner, such relay being sufficiently slow acting as to be maintained picked up during the "off" periods formed by the code transmitter relay 7PC. The relay 8AR of course is active only when the track section 7T is occupied by the train because of its marginal characteristics rendering it operable only when the track section 7T is shunted by the train. It is of course possible, in accordance with the requirements of practice, to adjust the characteristics of the approach relay 8AR so that it becomes active as soon as the train A enters the track section 7T, or as soon as the train is a predetermined distance in advance of the entering signal 8.

When relay 8ARP is picked up, the circuit by which the relay 8NC has been active for the transmission of a 75— code through the siding sections is opened at back contact 241. The opening of such contact removes the 75— code from the track section 8T, and the dropping away of the relay 8NH¹ (see Fig. 2B) at the right-hand end of track section 8T of course renders the relay 9NC inactive by opening its circuit at front contact 253. Therefore, at the right-hand end of track section 9T, the relay 9NH¹ (see Fig. 2C) is dropped away, and the dropping away of such relay causes the relay 9NHP to be dropped away by opening its circuit at front contact 127. When relay 9NHP is dropped away, the circuit which has been described for the yellow lamp 9Y of signal 9 is opened at front contact 130, and the closing of back contact 130 causes the illumination of the red lamp 9R of signal 9, dependent of course upon the closure of the approach lighting contact 129 of relay 9ARP.

Approach lighting is provided for the entering signal 8 by the inclusion of front contact 57 (see Fig. 2A) of the approach repeater relay 8ARP in the circuits for the signal lamps in order that a check may be provided upon the picking up of the relay 8ARP. That is, in accordance with the present invention, it is to be understood that an entering signal having its lamps dark when a train approaches is an "absolute" or "stop and stay" signal, while the illumination of the red lamp of such signal is assumed to be a "permissive" indication as commonly provided in APB systems. Therefore, for example, under the conditions illustrated in Fig. 1H, the train A must "stop and stay" unless the approach repeater relay ARP has been picked up. This means that the train B is given the entire siding section for braking distance in case of failure of the relay 8ARP to pick-up and put signal 9 to danger, while the train A is allowed to "stop and proceed" past the signal 8 if the red lamp is illuminated.

Inasmuch as the circuits for the control of the signals 8 and 9 are similar, it is believed to be readily apparent to those skilled in the art that a similar mode of operation to that which has just been described is effective for the overlap control of signal 8 where the east bound train A approaches the siding 24 prior to the approach of the west bound train B. That is, with reference to Figs. 1I and 1J, in which the train A is assumed to have accepted the leaving signal 4 prior to the acceptance by the train B of the leaving signal 13, the entering signal 8 has effectively a single track circuit overlap control, while the opposing signal 9 has effectively an overlap control extending to the next siding.

According to the location of the headblock signals as shown in this embodiment of the present invention, no signals are provided for governing entrance of trains into the sidings, as it is understood that the trains stop and proceed into the sidings past danger signals. It is believed to be readily apparent, however, to those familiar with the art how detector track sections and signals governing etrance to the sidings can be provided if they are required in practice.

It will be noted that the stick relays for entering signals have their circuits broken through the switch circuit controllers. This is to provide proper opposing signal protection in case of the meeting of trains. More specifically, with reference to siding 24, for example, the stick relay 8S (see Fig. 2A), although picked up as has been described for east bound main line trains, is dropped away whenever the track switch at the left-hand end of the siding is reversed. Thus, the stick relay 8S is prevented from picking up, or is dropped away if it has had an opportunity to be picked up, each time the track switch at the left-hand end of siding 24 is reversed, so as to open the circuits for relay 8S at contact 151. The picked up or dropped away condition of relay 8S of course selects respectively a 75+ or a 75— code for transmission through the track section 7T. If the 75+ code is transmitted, the leaving signal 4 at siding 23 will be allowed to clear for a following train, but if the 75— code is transmitted, the leaving signal 4 at siding 23 will be put to caution.

The throwing of either of the track switches at a siding shunts the siding section with which such switch is associated. The shunting of a siding section of course causes the entering signals at both ends of that siding to be conditioned to display danger indications. For example, the reversal of the switch at the left-hand end of siding 24 shunts the track section 8T by the shifting of contact 151 of the switch circuit controller, and the shunting of such track section interrupts the codes being transmitted for the control of the opposing signals 8 and 9 to cause such signals, because of the deenergized condition of their D, H and HP relays, to be conditioned (dependent upon approach lighting) for the display of danger indications.

It is believed from the mode of operation which has been described for typical traffic conditions, that it will be readily apparent to those familiar with the art how the system provides adequate signal indications for the various different conditions of traffic which may be encountered in practice, such as switching movements at the sidings. For example, if an east bound train, after having passed the signal 10, desires to enter the siding, the signal 9 will display a caution indication under a condition similar to the caution indication of signal 3 of Fig. 1C, until the track switch is reversed. The reversal of the track switch of course shunts the track section 9T and causes signal 9 to display a danger indication. When the switch is restored to its normal position after the train enters the siding, the normal conditions of the system are again restored. Conversely, if the train wishes to leave the siding so as to pass signal 10 and then reverse its direction of traffic, the train will proceed out of the siding past a clear signal 10 (providing the trackway is unoccupied in advance of such signal). After the track switch has been restored to normal, the signal 9 will display a caution indication because of the reception of an inverse code of positive polarity for its control. The conditions of code transmission through the siding sections under such conditions would be the same as described under normal conditions except that the driven code transmitted through track section 9T would be at a 75 rate rather than a 180 rate, as selected by front contact 180 of the stick relay 10S. The relay 10S would of course be dropped away as soon as the tract section 10T would become unoccupied in the rear of the train.

*Modification*

It will be noted from the description as it has been set forth that certain signals are cleared at times when there is no train approaching them under conditions where they really should display caution indications. Such a condition is shown in Fig. 1C, for example, where the signal 2 is conditioned to display a clear indication at a time when the caution indication is desired. This is obviously because there is no train in approach of signal 2 to reverse the direction of code transmission in the track section 2T. As has been described, as soon as an east bound train leaves the next siding at the left of siding 23, the direction of driven code transmission will be reversed in the track section 2T to cause the 75+ code transmitted through track section 3T to be repeated into track section 2T. The reception of the 75+ code at signal 2 of course causes such signal to properly display a caution indication.

Of course, if approach lighting is provided, as is the case for all entering signals in this embodiment, there never is such a thing as a false clear indication displayed because the proper direction of code transmission is established before the approach lighting of the signal becomes effective. It can be provided, however, by modification of the circuits for the relays D as shown in Fig. 4, that a D relay can be picked up for clearing a signal only when such signal can properly be cleared. This is done by allowing a D relay to pick up only when the opposing signal is at stop.

Upon consideration of the mode of operation of the system as it has been described, it will be noted that the only signals at the headblocks having D relays are the entering signals, as the leaving signals are cleared only by inverse codes. Thus by interlocking the relays D with opposing signals, the entering signals are conditioned to be clear by the picking up of D relays only after the tumble-down has been completed to such signals. At this time of course the proper direction of driven code transmission for the control of the leaving signal involved is also established.

This means that a relay D can be picked up only when it is proper that the signal with which it is associated should be cleared.

If the opposing signal interlock is desired in practice it can be provided, for each relay D, as typically shown for the relay 8D¹ of Fig. 4. In Fig. 4 the circuit for relay 8D has been modified so as to include back contacts of the opposing signal control relays 7PH, 7NH and 7S. The circuit extends from one side of the rectifier 262, including back contact 263 of relay 7PH, back contact 264 of relay 7NH, back contact 265 of relay 7S, and winding of relay 8D¹, to the opposite terminal of the rectifier 262. It is to be understood that each of the relays D shown in Figs. 2A to 2F inclusive can be controlled in a similar manner if desired in practice.

Having described a signaling system for a particular typical track layout as one specific embodiment of the present invention, it is desired to be understood that this form is selected to facilitate in the disclosure of the invention rather than to limit the number of forms which the invention may assume, and it is to be further understood that various modifications, adaptations and alterations may be applied to the specific form to meet the requirements of practice, without in any manner departing from the spirit or scope of the present invention except as limited by the appended claims.

What I claim is:

1. In a block signaling system of the character described for a stretch of main track having associated therewith two passing sidings separated by a plurality of blocks, each siding having a leaving signal to govern traffic therefrom toward the other siding; track circuit code communication means for the various blocks for communicating over the track rails by continuous distinctive codes formed of time spaced impulses any selected one of a plurality of distinctive signal controls from the leaving signal at one siding to the leaving signal at the other siding; control selecting means at a particular one of said leaving signals effective to select one control for communication by track circuit code to the opposing leaving signal if the trackway is unoccupied in approach to such particular signal, and effective to select another control for communication by track circuit code to the opposing leaving signal if the trackway is occupied in approach to such particular signal; and signal control means at said opposing leaving signal effective to clear such signal if said one control is selected, and effective to cause such signal to be put to caution if said another control is selected.

2. In an absolute-permissive-block signaling system for single track railroads for a stretch of main track provided with two passing sidings spaced a plurality of blocks apart, each of the sidings having a leaving signal for governing traffic therefrom toward the other siding; track circuit code communication means for the various blocks for communicating by continuous distinctive codes of impulses any selected one of a plurality of distinctive signal controls from a given leaving signal to the opposing leaving signal at the next siding; signal control selecting means at said given leaving signal effective to select one signal control for communication by track circuit code to the opposing leaving signal if the trackway in the rear of such given signal is occupied by a train proceeding in a given direction, and effective to select another signal control for communication by track circuit code to the opposing leaving signal if the trackway in the rear of such given signal is occupied by a train proceeding in the opposite direction; and signal control means at said opposing leaving signal effective to cause such signal to indicate clear if said one signal control has been selected, and effective to cause such signal to indicate caution if said another signal control has been selected.

3. In an absolute-permissive-block signaling system of the character described for a stretch of main track having passing sidings spaced a plurality of blocks apart, each of the sidings having a leaving signal for governing traffic therefrom toward the other siding; track circuit code communication means for the various blocks for communicating by continuous distinctive codes of impulses any selected one of a plurality of distinctive signal controls from a given leaving signal to the opposing leaving signal; a stick relay at the location of said given leaving signal; circuit means for energizing said stick relay when the trackway at the rear of said given signal is occupied by a train only if such train is proceeding in a given direction; signal control selecting means at said given leaving signal effective to select one signal control for communication by track circuit code to the opposing leaving signal if said stick relay is deenergized and there is a train in the rear of such given signal, and effective to select another signal control for communication by track circuit code to the opposing leaving signal if said stick relay is picked up; and signal control means at said opposing leaving signal effective to cause such signal to be put to caution if said one signal control has been selected, and effective to cause such signal to clear if said another signal control has been selected.

4. In a block signaling system for railroads for a stretch of main track having associated therewith two passing sidings separated by a plurality of blocks, each siding having a leaving signal for governing traffic therefrom toward the other siding; track circuit code communication means for the various blocks for communicating over the track rails by continuous distinctive codes of time spaced impulses any selected one of a plurality of distinctive signal controls from the leaving signal at one siding to the opposing leaving signal at the other siding; signal control selecting means at each of the leaving signals effective to select one signal control for communication by track circuit code to the next siding if the trackway is unoccupied in approach to such signal, and effective to select another signal control for communication by track circuit code to the next siding if the trackway is occupied in approach to such signal; and electro-responsive means at each of the leaving signals effective to clear such signal if said one signal control is selected for communication at the opposing leaving signal, and effective to cause that signal to be put to caution if said another signal control is selected for communication at the opposing leaving signal.

5. In an absolute-permissive-block signaling system of the character described for a stretch of main track having associated therewith two passing sidings separated by a plurality of blocks, each siding having a leaving signal for governing traffic therefrom toward the other siding; track circuit code communication means for the various blocks for communicating by continuous distinctive track circuit codes of impulses any selected one of a plurality of distinctive signal controls from the leaving signal at one siding to the leaving signal at the other siding; signal control selecting means at each of the leaving signals effective to select one signal control for communication by track circuit code to the next siding if the trackway in the rear of such signal is occupied by a train proceeding in a given direction, and effective to select another signal control for communication by track circuit code to the next siding if the trackway in the rear of such signal is occupied by a train proceeding in the opposite direction; and signal control means at each of the leaving signals effective to clear such signal if said one control is communicated from the next siding, and effective to cause such signal to be put to caution if said another control is communicated from the next siding.

6. In an absolute-permissive-block signaling system for a stretch of main track having associated therewith two passing sidings separated by a plurality of blocks, each siding having a leaving signal for governing traffic therefrom toward the other siding; track circuit code communication means for the various blocks for communicating over the track rails by continuous distinctive track circuit codes of impulses any selected one of a plurality of distinctive signal controls from the leaving signal at one siding to the opposing leaving signal at the other siding; a stick relay at the location of each of the leaving signals; circuit means for energizing the stick relay for one location only when a train is proceeding in a given direction; circuit means for energizing the stick relay for the other location only when a train is proceeding in the opposite direction; signal control selecting means at each of the leaving signals effective to select one signal control for transmission to the next siding if the stick relay at that signal is deenergized and there is a train in the rear of that signal, and effective to select another signal control for communication to the next siding if the stick relay for that signal is picked up; and signal control means at each of the leaving signals effective to clear such signal if said one control is communicated from the next siding, and effective to cause such signal to be put to caution if said another control is communicated from the next siding.

7. In a block signaling system for single track railroads for a stretch of main track divided into blocks having a passing siding and a first signal adjacent the siding and a second signal in the rear thereof for governing approach to the siding for a given direction of traffic; track circuit code communication means for each of the blocks effective to communicate by selected continuous codes of impulses various distinctive signal controls through the blocks in advance of the respective signals; code selecting means for the block in advance of the first signal effective to select one code for transmission through the block to such signal if the second block in advance is occupied by a train proceeding in said given direction, and effective to select another code for transmission to such signal if the third block in advance is occupied by an opposing train; electro-responsive means at the first signal operable to cause such signal to indicate caution whenever either said one or said another code is transmitted to such signal; code selecting means for the block in advance of the second signal effective to select a particular code for transmission through that block to such signal, only if said first signal is at caution due to the transmission of said another code rather than said one code through the block in advance thereof; and electro-responsive means at the second signal operable to cause such signal to indicate caution if said particular code is selected at the next signal in advance.

8. In a block signaling system of the character described for a stretch of main track divided into blocks having a passing siding and a first entering signal adjacent the siding and a second signal in the rear thereof for governing passage of a train toward the siding for a given direction of traffic; track circuit code communication means for each of the blocks effective to communicate by continuous codes of selected polarities various distinctive signal controls through the blocks in advance of the respective signals; polarity selecting means for the block in advance of said first signal effective to select one polarity for the impulses to be transmitted through the block for the control of such signal if the second block in advance is occupied by a train proceeding in said given direction, and effective to select the opposite polarity for the impulses to be transmitted through such block if the third block in advance is occupied by an opposing train; electro-responsive means at the first signal operable to cause such signal to indicate caution whenever a code of either polarity is communicated to that signal through the block in advance; code selecting means for the block in advance of the second signal effective to select a particular code for transmission to such signal, only if said first signal is at caution due to the selection of a code of said one polarity rather than the code of said other polarity for the block in advance of that signal; and electro-responsive means at the second signal operable to cause such signal to indicate caution if said particular code is selected at the next signal in advance.

9. In a block signaling system of the character described for a stretch of main track divided into blocks having a passing siding and a first signal adjacent the siding and a second signal in the rear thereof for governing approach to the siding for a given direction of traffic; track circuit code communication means for each of the blocks effective to communicate by selected continuous codes of impulses various distinctive signal controls through the blocks in advance of the respective signals; a stick relay for the second blocks in advance of said first signal; circuit means for energizing said stick relay when said second block is occupied by a train, only if such train is proceeding in said given direction; code selecting means for the block in advance of the first signal effective to select one code for transmission through that block to such signal if said second block is occupied by a train and said stick relay is picked up, and effective to select another code for transmission to such signal if the third block in advance is occupied by an opposing train; signal control means at the first signal operable to cause such signal to indicate caution when said one or said another code is transmitted to such signal; code selecting means for the block in advance of the second signal effective to select a particular code for transmission through that block to such signal, only if said first signal is at caution in accordance with the transmission of said another code through the block in advance thereof; and electro-responsive means at the second signal operable to cause such signal to indicate caution if said particular code is selected at the next signal in advance.

10. In an absolute-permissive-block signaling system of the character described for a stretch of single track divided into blocks and having first and second passing sidings a plurality of blocks apart, the first siding having an entering signal governing traffic in the direction of the second siding; track circuit code communication means for each of several blocks in advance of said signal for communicating by continuous distinctive track circuit codes various selected controls to said signal in accordance with traffic conditions for several blocks in advance; signal control selecting means for the first block beyond the first siding effective to select one control for transmission to said signal if such first block is occupied by an opposing train, and effective to select another control for transmission to said signal if there is an opposing train between the first and second sidings but not occupying such first block; and signal control means for said signal effective to cause such signal to indicate stop when said one control is selected, and effective to cause such signal to indicate caution when said another control is selected.

11. In an absolute-permissive-block signaling system for a stretch of single track divided into blocks having a passing siding associated therewith and an entering signal for one end of the siding for a given direction of traffic; track circuit code communication means for each of the blocks in advance of said signal effective to transmit by continuous distinctive track circuit codes various selected distinctive controls for governing said signal in accordance with traffic conditions for several blocks in advance; signal control selecting means for the first block beyond the siding in said given direction effective to select one control for transmission through the siding section if such first block is occupied by a train proceeding in said given direction, and effective to select another control for transmission through the siding section if such first block is occupied by a train proceeding in the opposite direction; and signal control means for said entering signal effective to cause such signal to indicate caution when said one control is selected for transmission, and effective to cause such signal to indicate danger when said another control is selected.

12. In an absolute-permissive-block signaling system of the character described for a stretch of single track divided into blocks having a passing siding associated therewith and an entering signal for one end of the siding for a given direction of traffic; track circuit code communication means for each of the blocks in advance of said signal effective to transmit by continuous track circuit codes various selected distinctive controls for governing said signal in accordance with traffic conditions in advance thereof; a stick relay for the first block beyond the siding in said given direction; circuit means for energizing said stick relay when said first block is occupied by a train, only if such train is proceeding in said given direction; signal control selecting means for said first block effective to select one control for transmission through the siding section if said stick relay is picked up, and effective to select another control for transmission through the siding if such first block is occupied by a train proceeding in the opposite direction; and signal control means for said entering signal effective to cause such signal to indicate caution when said one control is selected for transmission, and effective to cause such signal to indicate danger when said another control is selected.

13. In an absolute-permissive-block signaling system of the character described for a stretch of single track divided into blocks and having first and second passing sidings a plurality of blocks apart, the first siding having an entering signal governing traffic in a direction toward the second siding; track circuit code communication means for each of several blocks in advance of said signal for communicating by continuous distinctive track circuit codes various selected controls to said signal in accordance with traffic conditions for several blocks in advance; a series relay for the first block beyond the first siding in advance of said signal; circuit means for picking up said series relay only when said first block is occupied by a train; signal control selecting means for said first block effective to select one control for communication to said signal when the blocks between the sidings are unoccupied, and effective to select another control for communication to said signal when there is a train between the sidings, the transmission of either said one or said another control being ineffective when said series relay is picked up; and signal control means at said signal effective to cause such signal to clear when said one control has been selected, effective to cause such signal to display a caution indication when said another control has been selected, and effective to cause such signal to display a danger indication when said series relay is picked up.

14. In an absolute-permissive-block signaling system for a stretch of single track divided into blocks and having a signal for governing a given direction of traffic at the entrance to one of the blocks; track circuit code communication means for each of the blocks effective to transmit by distinctive track circuit codes various selected distinctive signal controls for governing said signal in accordance with traffic conditions for several blocks in advance thereof; signal control selecting means for the second block in advance of said signal effective to prevent transmission of codes to said signal if a portion of said block is occupied, but acting to select one control for communication to said signal if the remaining portion of such block is occupied by a train proceeding in said given direction, and effective to select another control for communication to said signal if such second block is entirely unoccupied by a train proceeding in said given direction; and signal control means at said signal for causing such signal to indicate danger in the absence of either of said controls and caution if said one control has been selected, and for causing such signal to indicate proceed if said another control has been selected.

15. In an absolute-permissive-block signaling system for a stretch of track divided into blocks, there being a passing siding associated with a particular one of the blocks, such particular block having two track sections; a track circuit for each of the track sections; a code transmitter and a code receiver for each end of each of the track sections for communication by continuous selected driven and inverse codes various distinctive signal controls through said particular block, the direction of driven code transmission through each of the track sections being selected in accordance with traffic conditions; code direction selecting means for each of the track circuits operable to select a driven code for transmission toward the center of said particular block if there is no train in approach of the siding, and operable to select the direction of driven code transmission to be toward a train when it approaches the siding from either direction; and circuit means responsive to the establishment of a direction of driven code transmission in accordance with the approach to the siding of a train for maintaining such direction of driven code transmission, irrespective of the subsequent approach of an opposing train.

16. In a signaling system of the character described for a stretch of track divided into blocks, there being a passing siding associated with a particular one of the blocks, such particular block having two track sections and a signal for governing entrance to the block for each direction of traffic; a track circuit for each of the track sections having a code transmitter and a code receiver at each end thereof, the transmitter and receiver for each of the track circuits being operable when rendered active to communicate signal controls by selected driven codes transmitted in a selected direction; code direction selecting means for each of the track circuits operable to select a driven code for transmission toward the center of said particular block if there is no train in approach of the siding, and operable to select the direction of driven code transmission to be toward a train when it approaches the siding from either direction; and signal clearing means for each of the signals effective to cause such signal to display a clear indication if a particular signal control is communicated to that signal by a track circuit driven code transmitted through the track section immediately in advance thereof.

17. In an absolute-permissive-block signaling system for a stretch of main track having two passing sidings and a leaving signal for each siding for governing traffic therefrom toward the other siding; coded track circuit means for communicating one signal control from a given leaving signal to the opposing leaving signal if the stretch of track is unoccupied, and means including said coded track circuit means for communicating and other signal contact from such given signal to the opposing leaving signal if there is a train in the rear of said given signal, such track circuit means being effective to clear said opposing leaving signal if said one control is communicated, and being effective to cause such opposing leaving signal to be put to caution if said another control is communicated.

18. In a coded track circuit signaling system for single track railroads including a stretch of single track between two passing sidings, a siding track section opposite one passing siding, an entering signal governing traffic into said one passing siding, an intermediate signal in the rear of said entering signal for governing traffic in the same direction, a head block signal at said other siding for governing train movement over said stretch toward said one siding, code transmitting means for transmitting a driven code in said siding section away from said entering signal and an inverse code in the opposite direction, means responsive to a train approaching said one siding in a direction opposite to that governed by said entering signal for changing the character of the inverse code to cause said entering signal to indicate stop and to cause said intermediate signal to indicate caution without affecting the indication of said head block signal, and means responsive to the cessation of the inverse code of said siding section when said train has advanced into that siding section for controlling the codes transmitted over the rails of the stretch to said head block signal to cause it to indicate caution.

19. In a system for governing by coded track circuits and without line wires signals governing train movement at a passing siding of a single track railroad, a passing siding, a stretch of single track extending in each direction from said passing siding, a siding track section opposite the passing siding, an entering signal for governing train movement into said siding section, an intermediate signal in the rear of said entering signal and governing train movement in the same direction, means for normally transmitting over the track rails of said siding track section a driven code in a prevailing direction away from said entering signal and an associated inverse code in the opposite direction toward said entering signal, code reversing means responsive to the cessation of the driven code in said prevailing direction for transmitting a driven code in the opposite direction in said siding track section, means governed by a train approaching said siding in one stretch of single track in the direction of traffic governed by said entering signal for stopping the transmission of the driven code in the prevailing direction and thereby cause operation of said code reversing means, and means governed by a train approaching said siding in the other stretch of single track and moving in a direction opposite to the direction of traffic governed by said entering signal for controlling the inverse code in said siding section and thereby cause said intermediate signal to give a double distant caution indication.

20. In a coded track circuit signaling system for single track railroads, a passing siding, a stretch of single track extending in each direction from said passing siding, a siding track section opposite the passing siding, an entering signal for governing train movement into said siding section and toward a particular single track stretch, an intermediate signal in the rear of said entering signal and governing train movement in the same direction, means for normally transmitting over the track rails of said siding track section a driven code in a prevailing direction away from said entering signal and an associated inverse code in the opposite direction toward said entering signal, means governed by a train in said particular stretch of single track only if that train is approaching said siding and moving in a direction opposite to the direction of traffic governed by said entering signal for controlling the inverse code in said siding section and thereby cause said intermediate signal to give a double distant caution indication.

21. In a coded track circuit signaling system for single track railroads, a passing siding and a stretch of single track extending away from said siding in each direction, each of such stretches of single track including an end track section adjacent the corresponding end of said siding, an intermediate signal associated with each end section for governing train movement toward the siding, means for transmitting a driven code of a selected code rate in each end section toward the corresponding intermediate signal, and means responsive to the entrance of a train into either of said stretches at the end remote from said siding for controlling the code rate of the driven code in the end section for the other stretch and thereby cause the associated intermediate signal to display a double distant caution indication.

22. In an absolute-permissive-block signaling system of the character described for a stretch of single track divided into blocks and having associated therewith first and second passing sidings a plurality of blocks apart, the first siding having an entering signal for governing traffic toward the second siding; track circuit code communication means for each of several blocks in advance of said signal for communicating by distinctive track circuit codes various selected controls to said signal in accordance with traffic conditions for several blocks in advance; signal control selecting means at the end of said first siding opposite from said entering signal for causing one control to be communicated by track circuit code to said signal if the stretch of track extending from such signal to the second siding is unoccupied by a train, and effective to cause another control to be transmitted to said signal if there is an opposing train in the stretch extending from such signal to the second siding but not within two blocks in advance of said signal; and signal control means for said signal effective to cause such signal to indicate clear when said one control is communicated, to indicate caution when said another control is communicated, and to indicate danger in the absence of the communication of either said one or said another control by track circuit code to such signal.

23. In a coded track circuit signaling system for single track railroads, a stretch of single track between passing sidings, a head block signal at each end of said stretch for governing train movement from the corresponding siding into said stretch, two intermediate signals located in a staggered relation in said stretch governing train movement in opposite directions, there being two track sections in the block in advance of each intermediate signal, decoding means associated with each intermediate signal and responsive to distinctive code impulses transmitted over the track rails of the track sections in advance of that signal for governing its clear and caution indications, means responsive to the presence of a train in the second track section in advance of an intermediate signal only if such train passed that signal in the direction of traffic governed thereby for steadily energizing the track rails of the first track section in advance of that signal, and means associated with said intermediate signal and responsive to such steady energization of the track rails for transmitting a caution control code over the track rails to the head block signal in the rear whereby a head block signal has an overlap control to include the track section between the staggered intermediate signals.

24. In a coded track circuit signaling system for single track railroads, a stretch of single track between passing sidings, a head block signal at each end of said stretch for governing train movement from the corresponding siding into said stretch, two intermediate signals located in a staggered relation in said stretch governing train movement in opposite directions, there being two track sections in the block in advance of each intermediate signal, and means responsive to the presence of a train in the block in advance of an intermediate signal only if that train entered said block moving in the direction of traffic governed by that signal for transmitting a caution control code over the track rails to the head block signal in the rear only if the first track section in advance of said intermediate signal is not occupied, whereby a head block signal has overlap control to include the track section between the staggered intermediate signals.

25. In a coded track circuit signaling system for railroads, a stretch of track including a first signal and a second signal governing train movements in the same direction over two successive blocks, the block in advance of said second signal being divided into two track sections, means for transmitting caution or clear control codes over the track rails of said two track sections for governing the indications of said second signal, decoding means associated with said second signal and responsive to the clear or caution control codes for transmitting a clear control code over the track rails of the block in advance of said first signal to cause such first signal to indicate clear, means responsive to the presence of a train in the second track section in advance of the second signal for distinctively energizing the track rails of the first track section in advance of such signal to detect its occupancy, and means associated with said second signal and responsive to said distinctive energization of the first track section for transmitting a caution control code over the track rails to cause said first signal to indicate caution when the second track section in advance of the second signal is occupied while the first track section is not occupied, whereby the first signal has an overlap control to include the first track section in advance of the second signal.

26. In a system for governing by coded track circuits and without line wires the movement of trains at a passing siding of a single track railroad, a siding track section opposite a passing siding and a stretch of single track extending in one direction from said siding track section, an entering signal for governing train movement from said stretch of track into said siding section, means for normally transmitting over the track rails of said siding track section a driven code in a prevailing direction away from said entering signal, code reversing means responsive to the cessation of the driven code in said prevailing direction in said siding section for automatically reversing the direction of the driven codes in that section, and means responsive to the presence of a train in said stretch of single track only if that train is moving toward said siding for stopping transmission of the driven code in the prevailing direction and thereby render effective said code reversing means to provide a driven code in the reverse direction for governing the indications of said entering signal.

27. In a coded track circuit signaling system for single track railroads comprising, an end track section of a stretch of single track adjacent a passing siding and having a head block signal at one end governing train movement into said stretch and having an intermediate signal at the other end governing traffic toward said siding; means for always transmitting a driven track circuit code from said siding toward said intermediate signal, said driven code having a rate determined in accordance with traffic conditions in approach to said head block signal; means for always transmitting an inverse track circuit code toward said head block signal in the track section immediately in advance thereof, said inverse code having pulses of positive or negative polarity as determined in accordance with traffic conditions in approach to said intermediate signal; decoding means associated with said head block signal and responsive to the polarity of said inverse code for governing the indications of said head block signal; and decoding means associated with said intermediate signal and responsive to the rate of said driven code for governing the indications of said intermediate signal, whereby said head block and said intermediate signals can always be controlled to give the proper indications without a reversal in the direction of transmission of the driven code.

28. In a block signaling system of the character described, a stretch of single track between passing sidings divided into track sections and including an end track section at each end of said stretch and an intermediate track section, a head block signal at each end of said stretch for governing train movement into such stretch, intermediate signals at the ends of said intermediate track section for governing train movements in both directions through such section, means for normally transmitting a driven code and an inverse code in each of said end sections, the driven code in each end section being transmitted at all times away from the adjacent siding, means for normally transmitting a driven and an inverse code in said intermediate section, the driven code transmission being in a predetermined normally prevailing direction, means responsive to the entrance of a train into either end section of the stretch for causing the cessation of code transmission in the direction away from the train in each track section of said stretch, means responsive to the cessation of code transmission in said intermediate section effective to set up the direction of driven code transmission in that section to be toward the train, means associated with each end of said stretch for governing the rate of impulse transmission for the driven code for that end section in accordance with traffic conditions, means associated with each intermediate signal for governing the polarity of the inverse code in the end track section in the rear thereof, decoding means at each of the intermediate signals for governing the clear and caution aspects of that signal in accordance with the rate of the driven code applied at the end section in advance thereof, and decoding means associated with each head block signal for governing the clear and caution aspects of that signal in accordance with the polarity of the inverse code transmitted in the track section in advance of such signal.

29. In a system for governing the indications of signals for single track railroads by coded track circuits without line wires, a stretch of single track between passing sidings divided into track sections and including an end track section at each end of said stretch, a head block signal at each end of said stretch for governing train movement into the stretch, intermediate signals at the ends of said end track sections remote from the sidings for governing train movement in opposite directions, means for normally transmitting a driven code and an associated inverse code in each of said end track sections, the driven code in each end track section of the stretch being transmitted at all times away from the adjacent siding toward the opposing intermediate signal, means responsive to the entrance of a train into either end section of the stretch for stopping transmission of the coding in each of the track sections of the stretch in a direction away from such train and thereby put to stop the opposing intermediate and head block signals, means associated with each intermediate signal for governing the polarity of the inverse code in the end track section in the rear thereof, and decoding means associated with each head block signal for governing the clear and caution aspects of that signal in accordance with the polarity of the inverse code transmitted toward that signal in the end track section immediately in advance thereof.

THOMAS J. JUDGE.